(12) United States Patent
Deguen et al.

(10) Patent No.: US 12,222,197 B2
(45) Date of Patent: Feb. 11, 2025

(54) DETECTOR FOR DETERMINING A POSITION OF AT LEAST ONE OBJECT

(71) Applicant: trinamix GmbH, Ludwigshafen am Rhein (DE)

(72) Inventors: Celal Mohan Deguen, Ludwigshafen (DE); Bernd Scherwath, Ludwigshafen (DE); Robert Send, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 1012 days.

(21) Appl. No.: 17/264,416

(22) PCT Filed: Jul. 31, 2019

(86) PCT No.: PCT/EP2019/070612
§ 371 (c)(1),
(2) Date: Jan. 29, 2021

(87) PCT Pub. No.: WO2020/025665
PCT Pub. Date: Feb. 6, 2020

(65) Prior Publication Data
US 2022/0113127 A1    Apr. 14, 2022

(30) Foreign Application Priority Data

Jul. 31, 2018    (EP) ..................................... 18186545

(51) Int. Cl.
*G06T 7/50*    (2017.01)
*G01B 11/14*    (2006.01)
(Continued)

(52) U.S. Cl.
CPC .............. *G01B 11/14* (2013.01); *G01B 11/22* (2013.01); *G06T 7/50* (2017.01); *G01B 2210/50* (2013.01);
(Continued)

(58) Field of Classification Search
None
See application file for complete search history.

(56) References Cited

U.S. PATENT DOCUMENTS 5,600,487 A  *  2/1997  Kiyomoto ............ G02B 6/4246
                                                  359/586
10,145,994 B2 * 12/2018  Moriuchi ............... G02B 5/201
(Continued)

FOREIGN PATENT DOCUMENTS

EP    2720013 A2    4/2014
GB    2077421 A    12/1981
(Continued)

OTHER PUBLICATIONS https://www.advancedoptics.com/dichroic-filters.html, accessed Aug. 17, 2024 (Year: 2024).*
(Continued)

*Primary Examiner* — Eric L Bolda
(74) *Attorney, Agent, or Firm* — Armstrong Teasdale LLP

(57) ABSTRACT

Described herein is a detector for determining a position of at least one object. The detector includes:
  at least one dichroic filter;
  at least one optical sensor; and
  at least one evaluation device. Also described herein are a method for determining a position of the at least one object and a method of using the detector.

17 Claims, 3 Drawing Sheets

(51) Int. Cl.
*G01B 11/22* (2006.01)
*G01S 7/48* (2006.01)
*G01S 7/4912* (2020.01)
*G06T 7/521* (2017.01)

(52) U.S. Cl.
CPC ........... *G01S 7/4802* (2013.01); *G01S 7/4912* (2013.01); *G06T 7/521* (2017.01)

(56) References Cited

U.S. PATENT DOCUMENTS

| | | | |
|---|---|---|---|
| 11,415,661 B2* | 8/2022 | Eberspach | ............... G01S 17/36 |
| 2003/0112444 A1 | 6/2003 | Yang et al. | |
| 2018/0112966 A1* | 4/2018 | Matsumiya | ........... G01J 3/2823 |

FOREIGN PATENT DOCUMENTS

| | | |
|---|---|---|
| JP | H03107709 A | 5/1991 |
| JP | H07286847 A | 10/1995 |
| JP | 2016102733 A | 6/2016 |
| WO | 2012110924 A1 | 8/2012 |
| WO | 2014097181 A1 | 6/2014 |
| WO | 2018091638 A1 | 5/2018 |
| WO | 2018091640 A2 | 5/2018 |
| WO | 2018091649 A1 | 5/2018 |

OTHER PUBLICATIONS

International Search Report and Written Opinion for corresponding PCT/EP2019/070612 mailed Oct. 1, 2019, 9 pages.
R.A. Street: Technology and Applications of Amorphous Silicon, Springer-Verlag Heidelberg, 2010, pp. 346-349.

* cited by examiner

DETECTOR FOR DETERMINING A POSITION OF AT LEAST ONE OBJECT

CROSS-REFERENCE TO RELATED APPLICATIONS

This application is a U.S. National Phase Application of International Patent Application No. PCT/EP2019/070612, filed Jul. 31, 2019, which claims the benefit of priority to European Patent Application No. 18186545.2, filed Jul. 31, 2018, the entire contents of which are hereby incorporated by reference herein.

FIELD OF THE INVENTION

The invention relates to detectors and methods for determining a position of at least one object. The invention further relates to a human-machine interface for exchanging at least one item of information between a user and a machine, an entertainment device, a tracking system, a camera, a scanning system and various uses of the detector devices. The devices, systems, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

A large number of detectors for detecting a position of at least one object are known, for example, detectors using depth from focus technologies, detectors using triangulation methods. A new concept of distance measurement distance by photon ratio is described in WO 2018/091649 A1, WO 2018/091638 A1 and WO 2018/091640 A1, the content of which is included by reference.

GB 2 077 421 A describes a sensor system which senses displacement of a target surface from a datum plane. It includes bifurcated fiber-optic, comprising light-emitter fibers and light-receiver fibers, used with a lens to project white light from lamp onto surface and conduct light reflected from it to photo-detector means whose output is a function of the displacement. Different target reflectivities are used and for determining the sense of the displacement two sensor channels are used, each sensing light at different wavelengths or wavelength bands with substantial spectral separation. Lens images the end surface of the fibers on surface and forms a secondary image on this end surface using the light reflected from the target, the datum plane being the average primary image plane for the two wavelengths. A photodiode senses red light and a photodiode senses blue light, beam splitter and filters being used to separate the red and blue light components of the light from fibers. The outputs are combined in either a differential or a proportional amplifier to produce a system output signal whose magnitude is dependent on the relative magnitudes of the light fluxes in the two channels, and is hence also a function target displacement from datum plane I.

EP 2 720 013 A2 describes a displacement sensor which includes a light source unit configured to apply light with different plural wavelengths in a direction oblique to a measurement region of a planar measured object, a spectroscope configured to measure spectral distribution of light reflected by the measurement region, a feature amount extracting module configured to extract a feature amount of the spectral distribution, and a displacement calculating module configured to calculate displacement of the measurement region based on the extracted feature amount and a relation between displacement and a feature amount acquired previously.

Despite the advantages implied by the above-mentioned devices and detectors, several technical challenges remain. Generally, a need exists for compact detectors configured for detecting a position of an object in space, which may be manufactured at low cost. In particular, for mobile applications such as for use in a smartphone or other mobile device, rapid, accurate and reliable detection of the position with minimal computing power is needed and a technical challenge. Determining distance using depth from photon ratio technology as disclosed in WO 2018/091649 A1, WO 2018/091638 A1 and WO 2018/091640 A1 by using, e.g. a quadrant diode may allow rapid distance determination but may have constrains with respect to illumination and position of light sources, e.g. on-axis illumination and fixed position of light sources may be required such that implementation for mobile applications may be difficult. Off-axis illumination may be possible using a CMOS-sensor but generation and evaluation of sensor signals may be much slower and requires more computing power.

PROBLEM ADDRESSED BY THE INVENTION

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a detector for determining a position of at least one object is disclosed. As used herein, the term "object" refers to a point or region emitting at least one light beam. The light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
at least one dichroic filter;
at least one optical sensor, wherein the optical sensor has at least one light-sensitive area, wherein the optical sensor is designed to generate at least one sensor signal in response to an illumination of its light-sensitive area by the light beam having passed through the dichroic filter;
at least one evaluation device being configured for determining a first sensor signal generated in response to illumination by the light beam having at least one first wavelength and a second sensor signal generated in response to illumination by the light beam having at least one second wavelength, wherein the evaluation device is configured for determining at least one longitudinal coordinate z of the object by evaluating a combined signal Λ from the first and second sensor signals.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range or within the near infrared range, for example in the range of 780 nm to 1000 nm.

The term light beam generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. As used herein, the term "beam profile" generally refers to a transverse intensity profile of the light beam. The beam profile may be a spatial distribution, in particular in at least one plane perpendicular to the propagation of the light beam, of an intensity of the light beam. The light beam specifically may be a Gaussian light beam or a linear combination of Gaussian light beams, as will be outlined in further detail below. Other embodiments are feasible, however. The transfer device may be configured for one or more of adjusting, defining and determining the beam profile, in particular a shape of the beam profile. As further used herein, a light spot generally refers to a visible or detectable round or non-round illumination of an article, an area or object by a light beam.

The incident light beam may propagate from the object towards the detector. The incident light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object and, thereby, is at least partially directed towards the detector. The illumination source, as an example, may be or may comprise one or more of an external illumination source, an illumination source integrated into the detector or an illumination source integrated into a beacon device being one or more of attached to the object, integrated into the object or held by the object. Thus, the detector may be used in active and/or passive illumination scenarios. For example, the illumination source may be adapted to illuminate the object, for example, by directing a light beam towards the object, which reflects the light beam. Additionally or alternatively, the object may be adapted to generate and/or to emit the at least one light beam. The light source may be or may comprise at least one multiple beam light source. For example, the light source may comprise at least one laser source and one or more diffractive optical elements (DOEs). The illumination source may be adapted to illuminate the object through the dichroic filter.

The detector may comprise the at least one illumination source for illuminating the object. As an example, the illumination source may be configured for generating an illuminating light beam for illuminating the object. The detector may be configured such that the illuminating light beam propagates from the detector towards the object along an optical axis of the detector. For this purpose, the detector may comprise at least one reflective element, preferably at least one prism, for deflecting the illuminating light beam onto the optical axis.

Specifically, the illumination source may comprise at least one laser and/or laser source. Various types of lasers may be employed, such as semiconductor lasers. Additionally or alternatively, non-laser light sources may be used, such as LEDs and/or light bulbs. The illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1000 nm, especially 500 to 1000 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. The illumination source may be integrated into a housing of the detector.

The illuminating light beam generally may be parallel to the optical axis or tilted with respect to the optical axis, e.g. including an angle with the optical axis. As an example, the illuminating light beam, such as the laser light beam, and the optical axis may include an angle of less than 10°, preferably less than 5° or even less than 2°. Other embodiments, however, are feasible. Further, the illuminating light beam may be on the optical axis or off the optical axis. As an example, the illuminating light beam may be parallel to the optical axis having a distance of less than 10 mm to the optical axis, preferably less than 5 mm to the optical axis or even less than 1 mm to the optical axis or may even coincide with the optical axis.

As used herein, the expression "the light beam has at least one wavelength" refers to a monochromatic light beam with the respective wavelength and/or a light beam comprising a plurality of wavelength, wherein at least one portion has the respective wavelength. The detector may comprise the at least one illumination source configured for illuminating the object with at least one light beam having at least two different wavelengths. For example, the illumination source may comprise at least two light sources, wherein a first light source may be configured for generating at least one light beam with a first wavelength and wherein a second light source may be configured for generating at least one light beam with a second wavelength different from the first wavelength. For example, the illumination source may comprise at least one multi-wavelength light source. The illumination source may comprise at least one filter element configured for selectively generating a light beam with different wavelength. The illumination source may be configured to pulse a light beam having the first wavelength and a light beam having the second wavelength with different frequencies.

The first and the second wavelength of the light beam may differ. Specifically the difference, in particular, the peak to peak difference, between the wavelengths may be at least 1 nm, preferably at least 10 nm, more preferably at least 50 nm.

Further, the illumination source may be configured for emitting modulated or non-modulated light. In case a plurality of illumination sources is used, the different illumination sources may have different modulation frequencies which may be used for distinguishing the light beams. The illumination source may be configured for generating light with different properties such as color and/or modulation frequencies. For example, the detector may comprise at least one modulation device. The modulation device may be configured for modulating at least one light beam generated by the illumination source at two different frequencies. The modulation device may be integrated into the at least one light source and/or may be independent from the light source. Thus, at least one light source might, by itself, be adapted to generate the above-mentioned modulation of the light beam, and/or at least one independent modulation device may be present, such as at least one chopper and/or at least one device having a modulated transmissibility, such as at least one electro-optical device and/or at least one acousto-optical device. The modulation device may be integrated into the illumination source such as into the driver circuit of an LED.

The illumination source may be a movable light source, in particular a freely movable light source. For example, the illumination source may comprise a movable laser, wherein the laser, specifically, is not fixedly connected, in particular not mechanically connected, with the optical sensor or with further optical elements of the detector. A detected laser spot may be controlled manually or automatically by moving the laser. For example, the illumination source may be a beacon device. The beacon device may be moved manually and the optical sensor may be configured for detecting a position of the light source. A range of movement may be limited in a transversal direction by a field of view of the detector optics. In a longitudinal direction the range of movement may depend on the measurement range of the detector.

The detector may comprise at least one transfer device. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensor. The transfer device specifically may comprise one or more of: at least one lens, for example at least one lens selected from the group consisting of at least one focus-tunable lens, at least one aspheric lens, at least one spherical lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may comprise at least one gradient index (GRIN) lens such as GRIN lenses available from Grintech GmbH, Schillerstraße 1, 07745 Jena, Germany. The GRIN lens may have a continuous refraction gradient, for example, an axial and/or radial and/or spherical refraction gradient. The f-number of the GRIN lens may be dependent on a lens length. Using GRIN lenses may allow miniaturizing optics, in particular using very thin optics. For example, very thin optics with a thickness or diameter of 0.2 mm may be possible. The transfer device may comprise at least one annular axial lens, for example with torus form. The annular axial lens may have a plano-convex form, for example, an axial and/or radial and/or spherical curvature.

The transfer device has at least one focal length in response to the at least one incident light beam propagating from the object to the detector. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device may comprise at least one wavelength-selective element, for example at least one optical filter. Additionally, the transfer device may be designed to impress a predefined beam profile on the electromagnetic radiation, for example, at the location of the sensor region and in particular the sensor area. The above-mentioned optional embodiments of the transfer device may, in principle, be realized individually or in any desired combination.

The transfer device, in particular the focal length and the numerical aperture NA, may be selected depending on measurement applications. This may allow achieving a higher dynamic range in a shorter measurement interval or a lower dynamic range in a larger measurement interval. The transfer device may have a numerical aperture between 0.1 and 1.0, preferably between 0.2 and 0.9, more preferably between 0.3 and 0.8.

The transfer device may be adapted to adjust and/or to change the direction of propagation of the light beam. The transfer device may comprise at least one optical axis. The transfer device may be adapted to influence, for example to divert, the light beam propagating from the object to the detector. In particular, the transfer device may be adapted to adjust the direction of propagation of the light beam. The transfer device may be adapted to adjust and/or to generate an angle of propagation with respect to the optical axis of the transfer device. The angle of propagation may be an angle between the optical axis of the transfer device and the direction of propagation of the light beam propagating from the object to the detector. Without using a transfer device the angle of propagation of the light beam may depend primarily on properties of the object, such as surface properties and/or material properties, from which the light beam was generated. The transfer device may be adapted to adjust and/or to generate the angle of propagation such that it is independent from surface properties of the object. The transfer device may be adapted to strengthen and/or to amplify angle dependency of the direction of propagation of the light beam. Without wishing to be bound by theory, the light beam generated by the object may propagate from the object to the detector and may impinge on the transfer device under an angle range from 0°, i.e. the optical axis, to an arbitrary angle X, which may be defined by an origin of the scattering on the object to an edge of the transfer device. Since the transfer device may comprise focusing properties, the angle range after passing through the transfer device may differ significantly from the original angle range. For example, light beams impinging parallel to the optical axis may be focused on the focal point or focus. Depending on focusing properties of the transfer device the angle dependency before impinging on the transfer device and after passing through the transfer device may be inverted. The transfer device may be adapted to amplify the angle dependency for a far field, i.e. in case the object is arranged at far distances, wherein light beams are propagating essentially parallel to the optical axis. Generally, without using the transfer device the angle dependency may be greatest in near field regions. In the near field, signals may generally be stronger compared to far field signals. Therefore, a smaller angle dependency in the near field due to a transfer device that amplifies the angle dependency in the far field, may be at least partially compensated by a generally better signal to noise ratio in the near field, and/or by using additional near field properties such as a distance dependent spot-movement due to a non-zero baseline.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally arranged or even symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The transfer device may comprise a significant mass of C, Si, or Ca, preferably at least 20 mass % of C, Si, or Ca, more preferably at least 27% of C, Si, or Ca.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate.

As used herein, the term "dichroic filter" refers to an optical color filter, specifically an interference color filter. The dichroic filter may have a wavelength dependent and angle dependent transmission spectrum An electromagnetic wave impinging on a first side, for example a surface of the dichroic filter may be partly, depending on the properties of the dichroic filter, absorbed and/or reflected and/or transmitted. The total power of the electromagnetic wave impinging on the dichroic filter may be distributed by the dichroic filter in at least three components, i.e. an absorption component, a reflection component and a transmission component. A degree of transmission may be defined as power of the transmission component normalized by the total power of the electromagnetic wave impinging on the dichroic filter. A degree of absorption may be defined as power of the absorption component normalized by the total power of the electromagnetic wave impinging on the dichroic filter. A degree of reflection may be defined as power of the reflection component normalized by the total power of the electromagnetic wave impinging on the dichroic filter. The term "absorption" refers to a reduction of power and/or intensity of the incident light beam by the dichroic filter. As used herein, the term "transmission" refers to a part of the electromagnetic wave which is measurable outside the dichroic filter in a half-space with angles from 90° and higher with respect to the optical axis. For example, transmission may be a remaining part of the electromagnetic wave impinging on the first side of the dichroic filter, penetrating the dichroic filter and leaving the dichroic filter at a second side, for example an opposite side. The term "reflection" refers to a part of the electromagnetic wave which is measurable outside the dichroic filter in a half-space with angles below 90° with respect to the optical axis. For example, reflection may be a change in direction of a wave front of the incident light beam due to interaction with the dichroic filter. As used herein, the term "transmission" further refers to effectiveness of the dichroic filter in transmitting radiant energy, in particular a fraction of incident electromagnetic power of an incident light beam that is transmitted through the dichroic filter. As used herein, the term "transmission spectrum" refers to transmission as a function of the wavelength. As used herein, the term "wavelength dependent transmission spectrum" refers to a property of the dichroic filter to selectively filter light of different wavelengths. The dichroic filter may be configured to let light having a first wavelength pass through the dichroic filter and to filter light having a second wavelength. The non-transmitted wavelength may be mostly be filtered.

The dichroic filter may be an interference filter having a high angle dependency. The angle dependency may be defined with respect to a cut-on/cut-off wavelength, specifically the cut-on or cut-off wavelength of the filter, where the transmission of the filter switches from transparent to intransparent. The cut-on/cut-off wavelength may be defined as the wavelength where the transmission curve is at the mean value of the mean intransparent and the mean transparent transmission coefficient. The angle dependency may be defined as the shift of the cut-on/or cut-off wavelength when rotating the filter out of a plane orthogonal to the optical axis by 30° around an axis orthogonal to the optical axis. The dichroic filter may have an angle dependency from 5 nm/30° up to 100 nm/30°, preferably from 7 nm/30° up to 80 nm/30°, more preferably from 9 nm/30° up to 50 nm/30°. In contrast, in optics applications typically, interference filters are used and required which have low, preferably no, angle dependency.

The dichroic filter may be an interference filter on a planar substrate, e.g., glass, which are specifically designed for orthogonal incident angles. A varying incident angle may lead to varying transmission properties. The angle dependency may be radially symmetric around the optical axis. In contrast, beam splitters, including dichroic mirrors, are designed for non-orthogonal angles of incidence, in most cases 45°. Incident angles other than a design angle result not only in a change of the spectral characteristics, but also in the reflection and transmission angles. Further, the angle-dependent transmission is not radially symmetric with respect to the optical axis. Generally, dichroic mirrors are beam splitters for different wavelengths. They reflect a specific wavelength region and transmit other regions. In contrast, the present invention uses at least two wavelengths for the measurement and may work with a single detector. Beam splitting necessitates more than one detector to capture both wavelengths and is, specifically, disadvantageous considering the bulky construction and extra costs associated with multiple detectors, etc. In addition, the present invention uses the varying transmission features of interference filters with changing incident angle for the chosen wavelengths. The varying reflection and transmission angles at a dichroic mirror with varying incident angle will lead to non-symmetrical effects. Thus, dichroic mirrors cannot be employed for measurements, where radial symmetry is essential, for example tracking of an active target in a 3-dimensional coordinate system.

The dichroic filter may be employed as one of a long-pass, a short-pass, a band-pass or a notch filter. Advantageously, due to the production technique, interference filters with high angle dependency can be produced with high temperature stability. The dichroic filter can be optimized for tracking applications by varying the steepness of the cut-on and/or cut-off slopes, and the angle dependency. The dichroic filter may be designed such that the transmission properties of the filter changes for both wavelengths as a function of incident angle, for example by adequately choosing the cut-on and cut-off wavelengths of a bandpass or notch-filter. The dichroic filter may be designed such that the transmission properties of one wavelength change with varying incident angle, while the transmission properties for the other wavelength remain the same, for example by adequately choosing the cut-wavelength of an edge-filter. The dichroic filter may be designed such that the transmission of the filter for the first wavelength increases with increasing incident angle, corresponding to an increasing distance, while the transmission for the second wavelength remains high and the same. Thus, at greater distances, where the light intensity is small, maximum transmission may be achieved for both wavelengths. The dichroic filter may be arranged orthogonal or essentially orthogonal to the optical axis. The dichroic filter may be arranged parallel or essentially parallel to the transfer device.

The dichroic filter may have an angle dependent transmission spectrum. As used herein, the term "angle dependent transmission spectrum" refers to the fact that transmission of the dichroic filter depends on an angle of incidence at which the incident light beam impinges on the dichroic filter. For example, the degree of transmission may depend on an angle of incidence at which the incident light beam propagating from the object towards the detector impinges on the dichroic filter. The angle of incidence may be measured with respect to an optical axis of the dichroic filter. The dichroic filter may be arranged in the direction of propagation behind the transfer device. The dichroic filter and the transfer device may be arranged such that the light beam propagating from the object to the detector passes through the transfer device before impinging on the dichroic filter. The dichroic filter may be arranged as such, that the light beam propagating from the object to the detector impinges on the dichroic filter between the transfer device and the focal point of the transfer device. Use of at least one transfer device allows to further enhancing robustness of the measurement of the longitudinal coordinate. The transfer device may, for example, comprise at least one collimating lens. The dichroic filter may be designed to weaken rays impinging with larger angles compared to rays impinging with a smaller angle. For example, the degree of transmission may be highest for light rays parallel to the optical axis, i.e. at 0°, and may decrease for higher angles. In particular, at at least one cut-off angle the degree of transmission may steeply fall to zero. Thus, light rays having a large angle of incidence may be cut-off.

For example, the dichroic filter may have a transmission spectrum such that a light beam may pass if the light beam impinges on the dichroic filter under an angle of transmission or a wavelength range of transmission and that the light beam is filtered if the light beam impinges under deviating angles of incidence or wavelength ranges. For example, in case the light beam impinges essentially parallel to an optical axis of the dichroic filter the light beam may pass through the dichroic filter and in case the light beam impinges under deviating angles of incidence the light beam may be filtered. As used herein, the term "essentially parallel to the optical axis of the dichroic filter" refers to the condition of a parallel orientation, with a tolerance of e.g. ±5° or less, preferably a tolerance of ±3° or less, more preferably a tolerance of ±1° or less. An angle of incidence of 0° refers to parallel to the optical axis.

As outlined above, the transmission spectrum of the dichroic filter may be wavelength dependent and angle dependent. For example, the transmission spectrum may be chosen such that a light beam having the first wavelength may pass if the light beam impinges essentially parallel to the optical axis of the dichroic filter, while a light beam having the second wavelength may pass the dichroic filter if the light beam impinges under larger angles, e.g. under 30°. The transfer device and the dichroic filter may be arranged such that the light beam propagating from the object to the detector propagates through the transfer device before impinging on the dichroic filter. For example, for objects near to a focal point of the transfer device, also referred to as nearfield, light beams behind the transfer device will be mostly parallel to the optical axis and a first transmission spectrum may apply to the light beams at the dichroic filter, e.g. the first wavelength may pass whereas the second wavelength may be mostly filtered. For example, for far objects, also referred to as far field, light beams will reach the transfer device essentially parallel to the optical axis of the transfer device and will be focused towards the focal point behind the transfer device. Thus, these light beams may have a larger angle to the optical axis of the dichroic filter and a different transmission spectrum may apply to the light beams at the dichroic filter, e.g. the second wavelength may pass whereas the first wavelength may be mostly filtered.

The dichroic filter may be arranged in a direction of propagation of the incident light beam propagating from the object to the detector behind the transfer device. The dichroic filter and the transfer device may be arranged such that the light beam propagating from the object to the detector passes through the transfer device before impinging on the dichroic filter. The transfer device and the dichroic filter may be arranged spatially separated, e.g. displaced in a direction perpendicular to the optical axis. The dichroic filter may be arranged as such, that the light beam propagating from the object to the detector impinges on the dichroic filter between the transfer device and the focal point of the transfer device. For example, a distance between the transfer device and the position where the light beam propagating from the object to the detector impinges on the dichroic filter may be at least 20% of the focal length, more preferably at least 50% of the focal length, most preferably at least 80% of the focal length.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the optical sensor. Other embodiments, however, are feasible. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

The light-sensitive area may be oriented towards the object. As used herein, the term "is oriented towards the object" generally refers to the situation that the respective surface of the light-sensitive area are fully or partially visible from the object. Specifically, at least one interconnecting line between at least one point of the object and at least one point of the light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Additionally or alternatively, at least one of the light-sensitive areas may be oriented differing from an orientation towards the object. For example, the optical sensor may be oriented perpendicular or under an arbitrary angle to the optical axis and with respect to the object. The dichroic filter may be configured to generate the light beam such that the light beam impinges on the light-sensitive area. For example, in case the light-sensitive area is oriented under the arbitrary angle with respect to the optical axis, the detector may comprise at least one optical element configured to guide the light beam onto the light-sensitive area. The dichroic filter may be arranged essentially parallel to the light sensitive area.

The optical sensor may be sensitive in one or more of the ultraviolet, the visible or the infrared spectral range. Specifically, the optical sensor may be sensitive in the visible spectral range from 500 nm to 780 nm, most preferably at 650 nm to 750 nm or at 690 nm to 700 nm. Specifically, the optical sensor may be sensitive in the near infrared region. Specifically, the optical sensor may be sensitive in the part of the near infrared region where silicon photodiodes are applicable specifically in the range of 700 nm to 1000 nm. The optical sensor, specifically, may be sensitive in the infrared spectral range, specifically in the range of 780 nm to 3.0 micrometers. For example, the optical sensor may be or may comprise at least one element selected from the group consisting of a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

The optical sensor specifically may be semiconductor sensors, preferably inorganic semiconductor sensors, more preferably photodiodes and most preferably silicon photodiodes. Thus, the present invention simply may be realized by using commercially available inorganic photodiodes, i.e. one small photodiode and one large area photodiode. Thus, the setup of the present invention may be realized in a cheap and inexpensive fashion. Specifically, the optical sensor may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, the optical sensor may be sensitive in the part of the near infrared region where silicon photodiodes are applicable specifically in the range of 700 nm to 1000 nm. Infrared optical sensors which may be used for the optical may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensor may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensor may comprise at least one at least one photoconductive sensor such as a PbS or PbSe sensor, a bolometer, preferably a bolometer selected from the group consisting of a VO bolometer and an amorphous Si bolometer. The optical sensor may be opaque, transparent or semitransparent. For the sake of simplicity, however, opaque sensors which are not transparent for the light beam, may be used, since these opaque sensors generally are widely commercially available. The optical sensor specifically may be uniform sensor having a single light-sensitive area. Thus, the optical sensor specifically may be a non-pixelated optical sensor.

As further used herein, the term "evaluation device" generally refers to an arbitrary device configured to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The evaluation device is configured for determining a first sensor signal generated in response to illumination by the light beam having at least one first wavelength and a second sensor signal generated in response to illumination by the light beam having at least one second wavelength. As outlined above, the light beams having the first wavelength and the second wavelength may be generated or pulsed with different frequencies and/or may be generated subsequently and/or may be modulated with different modulation frequencies. The evaluation device is configured for determining at least one longitudinal coordinate z of the object by evaluating a combined signal Λ from the first and second sensor signals. As used herein, the term "combined signal Λ" refers to a signal which is generated by combining the first and second sensor signals, in particular by one or more of dividing the first and second sensor signals, dividing multiples of the first and second sensor signals or dividing linear combinations of the first and second sensor signals. In particular, the combined signal Λ may be a quotient signal. The combined signal Λ may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider. The evaluation device may be configured for deriving the combined signal Λ by one or more of dividing the first and second sensor signals, dividing multiples of the first and second sensor signals, dividing linear combinations of the first and second sensor signals. The evaluation device may be configured for determining a first radiant intensity of the first sensor signal and a second radiant intensity of the second sensor signal. The evaluation device may be configured for determining a ratio of the first radiant intensity and the second radiant intensity for deriving the combined signal Λ. Other combined or quotient signals are feasible such as ratio of normalized radiant intensity. Thus, the relationship between at least two wavelengths having passed the dichroic filter depends on the distance between the object and the optical sensor. Only a single optical sensor is required. The detector may comprise a plurality of optical sensors such as partial diodes of a bi-cell, a split electrode PSD or quadrant diode, and/or a CMOS sensor. In this case, for determining the combined signal Λ, the evaluation device may determine the complete light spot on the optical sensors, such as a sum signal of the signals of the optical sensors. Alternatively, for determining the combined signal Λ, the evaluation device may use for the first and second sensor signal signals generated by identical sensor areas.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Field Programmable Gate Arrays (FPGAs), or digital signal processors (DSPs) which are configured to perform the above-mentioned evaluation, in order to determine the at least one longitudinal coordinate of the object. Additionally or alternatively, however, the evaluation device may also fully or partially be embodied by hardware.

The detector may further comprise one or more additional elements such as one or more additional optical elements. Further, the detector may fully or partially be integrated into at least one housing.

The determination of the longitudinal coordinate z using the combined signal Λ may be combined with further distance measurement techniques such as with one or more techniques based on depth from photon ratio, time of flight, triangulation and depth from defocus. Specifically, the determination of the longitudinal coordinate z using the combined signal Λ may be combined with non-wavelength dependent distance measurement techniques.

For example, the determination of the longitudinal coordinate z using the combined signal Λ may be combined with distance measurements using depth from photon ratio (DPR) techniques as described, for example, in WO 2018/091649 A1, WO 2018/091638 A1 and WO 2018/091640 A1, the content of which is included by reference. The detector may comprise at least two optical sensors. Each of the optical sensors may have at least one light-sensitive area. Each of the optical sensors may be designed to generate at least one sensor signal in response to an illumination of its respective light-sensitive area by the light beam having passed through the dichroic filter. At least one of the optical sensors may be configured for generating a first DPR-sensor signal and at least one of the optical sensors may be configured for generating a second DPR-sensor signal. The term "DPR-sensor signal" refers to a sensor signal which is used for distance determination using depth from photon ratio techniques. Specifically, the first DPR-sensor signal and the second DPR-sensor signals may be signals corresponding to parts or cuts of a beam profile. The evaluation device may be configured for determining the longitudinal coordinate $z_{DPR}$ of the object by evaluating a combined DPR-signal Q from the first and second DPR-sensor signals.

As used herein, the term "combined DPR-signal Q" refers to a signal which is generated by combining the first and second DPR-sensor signals, in particular by one or more of dividing the first and second DPR-sensor signals, dividing multiples of the first and second DPR-sensor signals or dividing linear combinations of the first and second DPR-sensor signals. In particular, the combined DPR-signal may be a quotient signal. The combined DPR-signal Q may be determined by using various means. As an example, a software means for deriving the combined DPR-signal, a hardware means for deriving the combined signal, or both, may be used and may be implemented in the evaluation device. Thus, the evaluation device, as an example, may comprise at least one divider, wherein the divider is configured for deriving the combined DPR-signal. The divider may fully or partially be embodied as one or both of a software divider or a hardware divider.

The evaluation device may be configured for deriving the combined DPR-signal Q by one or more of dividing the first and second DPR-sensor signals, dividing multiples of the first and second DPR-sensor signals, dividing linear combinations of the first and second DPR-sensor signals. Each of the first and second sensor signals may comprise at least one information of at least one area of a beam profile of the light beam having passed through the dichroic filter. The beam profile may be selected from the group consisting of a trapezoid beam profile; a triangle beam profile; a conical beam profile and a linear combination of Gaussian beam profiles. For example, the evaluation device is configured for deriving the combined DPR-signal Q by $$Q(z_o) = \frac{\int\int_{A_1} E(x, y; z_o)dxdy}{\int\int_{A_2} E(x, y; z_o)dxdy}$$

wherein x and y are transversal coordinates, A1 is a first area of the beam profile of the light beam having passed through the dichroic filter at a sensor position of the optical sensors, A2 is a second area of the beam profile of the light beam having passed through the dichroic filter at the sensor position of the optical sensors, and $E(x,y,z_o)$ denotes the beam profile given at the object distance $z_o$. At least one of the first DPR-sensor signal and the second DPR-sensor signal may comprise information of the first area of the beam profile and the other one may comprise information of the second area of the beam profile. For example, the first DPR-sensor signal may comprise information of the first area of the beam profile and the second DPR-sensor signal may comprise information of the second area of the beam profile. The first area of the beam profile and the second area of the beam profile may be one or both of adjacent or overlapping regions. Area A1 and area A2 may differ. In particular, A1 and A2 are not congruent. Thus, A1 and A2 may differ in one or more of the shape or content. The beam profile may be a cross section of the light beam. Generally the beam profile is dependent on luminance $L(z_o)$ and beam shape $S(x,y;z_o)$, $E(x, y; zo)=L\cdot S$. Thus, by deriving the combined DPR-signal it may allow determining the longitudinal coordinate independent from luminance. In addition, using the combined signal allows determination of the distance $z_o$ independent from the object size. Thus, the combined signal allows determination of the distance $z_o$ independent from the material properties and/or reflective properties and/or scattering properties of the object and independent from alterations of the light source such as by manufacturing precision, heat, water, dirt, damages on the lens, or the like. As used herein, the term "area of the beam profile" generally refers to an arbitrary region of the beam profile at the sensor position used for determining the combined DPR-signal Q.

One of the first area and the second area may comprise essentially edge information of the beam profile and the other one of the first area and the second area of the beam profile may comprises essentially center information of the beam profile. For example, the first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined DPR-signal Q by line integrals along the slice or cut. For improved accuracy, several slices or cuts through the light spot may be used and averaged. In case of an elliptical spot profile, averaging over several slices or cuts may result in an improved distance information.

The evaluation device may be configured to derive the combined DPR-signal Q by one or more of dividing the edge information and the center information, dividing multiples of the edge information and the center information, dividing linear combinations of the edge information and the center information. Thus, essentially, photon ratios may be used as the physical basis of the depth from photon ratio method.

The evaluation device may be configured for determining a ratio of the first DPR-sensor signal $I_1$ and the second DPR-sensor signal $I_2$ for deriving the combined DPR-signal Q. As an example, Q may simply be determined as $$Q=I_1/I_2$$

or $$Q=I_2/I_1.$$

Additionally or alternatively, Q may be determined as $$Q=a \cdot I_1/b \cdot I_2$$

or $$Q=b \cdot I_2/a \cdot I_1,$$

with a and b being real numbers which, as an example, may be predetermined or determinable. Additionally or alternatively, Q may be determined as $$Q=(a \cdot I_1+b \cdot I_2)/(c \cdot I_1+d \cdot I_2),$$

with a, b, c and d being real numbers which, as an example, may be predetermined or determinable. As a simple example for the latter, Q may be determined as $$Q=I_1/(I_1+I_2).$$

Typically, in the setup described above, Q is a monotonous function of the longitudinal coordinate of the object and/or of the size of the light spot such as the diameter or equivalent diameter of the light spot. Thus, as an example, specifically in case linear optical sensors are used, the quotient Q is a monotonously decreasing function of the size of the light spot. Without wishing to be bound by this theory, it is believed that this is due to the fact that, in the setup described above, both $I_1$ and $I_2$ decrease as a square function with increasing distance to the light source, since the amount of light reaching the detector decreases. Therein, however, the first DPR-sensor signal $I_1$ decreases more rapidly than the second DPR-sensor signal $I_2$, since, in the optical setup as used in the experiments, the light spot in the image plane grows and, thus, is spread over a larger area. The quotient, thus, continuously decreases with increasing diameter of the light beam or diameter of the light spot on the light-sensitive area. The quotient, further, is mainly independent from the total power of the light beam, since the total power of the light beam forms a factor both in the first sensor signal and in the second sensor signal. Consequently, the quotient Q may form a secondary signal which provides a unique and unambiguous relationship between the first and second sensor signals and the size or diameter of the light beam. Since, on the other hand, the size or diameter of the light beam is dependent on a distance between the object, from which the incident light beam propagates towards the detector, and the detector itself, i.e. dependent on the longitudinal coordinate of the object, a unique and unambiguous relationship between the first and second sensor signals and the longitudinal coordinate may exist. The evaluation device may be configured for using at least one predetermined relationship between the combined DPR-signal Q and the longitudinal coordinate for determining the longitudinal coordinate. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

As outlined above, in case of the detector comprises a plurality of optical sensors, it is possible to determine in addition to the wavelength dependent combined signal Λ the combined DPR-signal. For determining the wavelength dependent combined signal Λ, as outlined above, a quotient is determined of the wavelength dependent first sensor signal and the wavelength dependent second sensor signal. For example, the first sensor signal, e.g. for a red wavelength, and the second sensor signal, e.g. for a blue wavelength, may be generated by identical sensor areas S1 such that the quotient may be $red_{s1}/blue_{s1}$. For example, the first sensor signal, e.g. for a red wavelength, and the second sensor signal, e.g. for a blue wavelength, are determined by the sum of all sensor areas of the optical sensors such that the quotient may be $\Sigma red/\Sigma blue$. In addition, for determining the combined DPR-signal, as described above, a quotient of signals generated by two different sensor areas, e.g. S1 and S2, may be determined. One or both of the sensor signals for the combined DPR-signal may be a sum of the two wavelength dependent signals such that the combined DPR signal may be determined by $red_{S1}/red_{S2}$ or $blue_{S1}/blue_{S2}$ or $(red_{S1}+blue_{S1})/(red_{S2}+blue_{S2})$ or a combination thereof.

Determining in addition to the wavelength dependent combined signal Λ the combined DPR-signal allows an independent determination of two longitudinal coordinates using different measurement techniques. A combination of determining the wavelength dependent combined signal Λ and the DPR techniques is in particular advantageous since the same detector setup can be used for both measurements. The evaluation device may be configured to compare the longitudinal coordinates z and $z_{DPR}$. The evaluation device may be configured to determine differences between the longitudinal coordinates z and $z_{DPR}$. The evaluation device may be adapted to generate and to issue a warning and/or to reject the measurements in case the longitudinal coordinates z and $z_{DPR}$ differ more than a pre-defined threshold. The evaluation device may be adapted to determine a mean value of the longitudinal coordinates z and $z_{DPR}$. The detector may be configured to determine the longitudinal coordinate z and/or the longitudinal coordinate $z_{DPR}$ depending on the measurement range. For example, the detector may be configured for determining the longitudinal coordinate z in a first measurement range and for determining the longitudinal coordinate $z_{DPR}$ in a second measurement range. This may allow enhancing reliability of the distance determination and for extending the measurement range. In addition, for determining the longitudinal coordinate z, for example, two illumination sources may be used, wherein a first illumination source is configured for generating a light beam with a first wavelength and wherein a second illumination source is configured for generating a light beam with a second wavelength, different from the first wavelength. The determination of the longitudinal coordinate $z_{DPR}$ may allow for detecting of defects or failures of one of the illumination sources and at the same time may allow for determining of a distance even if one of the illumination sources is defective.

The detector may comprise a small baseline. In particular, the baseline may be a distance between at least one illumination channel and at least one receiver channel of the detector. Specifically, a distance, for example in a xy-plane, between at least one illumination channel and at least one receiver channel may be as small as possible. As used herein, the term "illumination channel" refers to at least one optical channel comprising at least one illumination source and/or at least one light emitting element such as at least one optical illumination fiber adapted to generate at least one illumination light beam for illuminating the at least one object. The illumination channel may comprise at least one transmitter-optics such as at least one illumination source and at least one lens element. As used herein, the term "receiver channel" refers to at least one optical channel comprising at least one optical element adapted to receive the light beam propagating from the object to the detector. The receiver channel may comprise at least one receiver-optics such as the at least one transfer device and the at least one dichroic filter and the optical sensor. The baseline, i.e. the distance between the illumination channel and the receiver channel, may be a minimum distance. The minimum distance may depend only on a size of components of the transmitter-optics and the receiver-optics. The minimum distance may be zero. In particular, a distance perpendicular to an optical axis of the detector between the illumination source and the optical sensors may be small. The distance perpendicular to the optical axis of the detector between the illumination source and the optical sensors may be less than 0.1 m, preferably less than 0.05 m, more preferably less than 0.025. In particular, the distance perpendicular to the optical axis of the detector between the illumination source and the optical sensors may be less than 0.01 m, preferably less than 0.005 m, more preferably less than 0.0025 m. In particular, the distance between the detector and the illumination source may be less than 150% of a diameter of the transfer device, preferably less than 110% of the diameter of the transfer device, more preferably less than 100% of the diameter of the transfer device. Embodiments, wherein the baseline is zero are possible. The illumination source and the optical axis may be separated by a small baseline. As used herein, the term "baseline", also denoted as basis line, further refers to a distance, for example in a xy-plane, between at least one transmitter-optics and at least one receiver-optics. For example, the baseline may be a distance between the optical axis and the illumination source, in particular a distance between the optical axis and a z-component of the illumination light beam. The detector may comprise additional optical elements, for example, at least one mirror, which may additionally enhance distance to the illumination source.

The optical sensor or, in case of a plurality of optical sensors, the optical sensors may be positioned off focus. As used herein, the term "focus" generally refers to one or both of a minimum extend of a circle of confusion of the light beam, in particular of at least one light beam emitted from one point of the object, caused by the transfer device or a focal length of the transfer device. As used herein, the term "circle of confusion" refers to a light spot caused by a cone of light rays of the light beam focused by the transfer device. The circle of confusion may depend on a focal length f of the transfer device, a longitudinal distance from the object to the transfer device, a diameter of an exit pupil of the transfer device, a longitudinal distance from the transfer device to the light-sensitive area, a distance from the transfer device to an image of the object. For example, for Gaussian beams, a diameter of the circle of confusion may be a width of the Gaussian beam. In particular, for a point like object situated or placed at infinite distance from the detector the transfer device may be adapted to focus the light beam from the object into a focus point at the focal length of the transfer device. For non-point like objects situated or placed at infinite distance from the detector the transfer device may be adapted to focus the light beam from at least one point of the object into a focus plane at the focal length of the transfer device. For point like objects not situated or placed at infinite distance from the detector, the circle of confusion may have a minimum extend at least at one longitudinal coordinate. For non-point like objects not situated or placed at infinite distance from the detector, the circle of confusion of the light beam from at least one point of the object may have a minimum extend at least at one longitudinal coordinate. As used herein, the term "positioned off focus" generally refers to a position other than the minimum extend of a circle of confusion of the light beam caused by the transfer device or a focal length of the transfer device. In particular, the focal point or minimum extend of the circle of confusion may be at a longitudinal coordinate $I_{focus}$, whereas the position of the optical sensor may have a longitudinal coordinate $I_{sensor}$ different from $I_{focus}$. For example, the longitudinal coordinate $I_{sensor}$ may be, in a longitudinal direction, arranged closer to the position of the transfer device than the longitudinal coordinate $I_{focus}$ or may be arranged further away from the position of the transfer device than the longitudinal coordinate $I_{focus}$. Thus, the longitudinal coordinate $I_{sensor}$ and the longitudinal coordinate $I_{focus}$ may be situated at different distances from the transfer device. For example, the optical sensor may be spaced apart from the minimum extend of the circle of confusion in longitudinal direction by ±2% of focal length, preferably by ±10% of focal length, most preferably ±20% of focal length. For example, at a focal length of the transfer device may be 20 mm and the longitudinal coordinate $I_{sensor}$ may be 19.5 mm, i.e. the sensor may be positioned at 97.5% focal length, such that $I_{sensor}$ is spaced apart from the focus by 2.5% of focal length.

As outlined above, the optical sensors may be arranged off focus. The optical sensor may be arranged such that the variance over distance dependence of the combined DPR-signal is maximal, which is equivalent to a maximum dynamic range in the combined DPR signal Q. Without wishing to be bound by this theory, a practical approximation for maximizing the dynamic range is to maximize a circle of confusion variance over distance dependence. The quotient of circle of confusion radii at small and large object distances is a practical approximation to the quotient of combined signals at small and large object distances. In particular, the optical sensor may be positioned as such that a combined DPR-signal $Q_{far}$ at large object distances and a combined DPR-signal $Q_{close}$ at small object distances have a maximum variation $$\frac{Q_{far}}{Q_{close}} \approx \frac{r_{CoC}^{Object,close}(z_O, z_s, z_i)^2}{r_{CoC}^{Object,far}(z_O, z_s, z_i)^2} \to \max,$$

wherein $r_{CoC}^{Object,close}$ is a radius of the circle of confusion at small object distances and $r_{CoC}^{Object,far}$ is a radius of the circle of confusion at large object distances, wherein $z_O$ is a detectable distance range between optical sensors and the object, $z_s$ is a distance between the transfer device and the optical sensor and $z_i$ is a position of the focused image behind the transfer device, which depends on the position of the object $z_o$. The optimal position of the optical sensors and/or the optimal position of the dichroic filter may be adjusted using the following steps: i) positioning the optical sensors at a focal point of farthest object distance; ii) moving the optical sensors out of the focal point, in particular along or against the optical axis, such that a distance Δ from the focal point gives the best circle of confusion variation and the largest range, wherein $$\Delta = \frac{z_i^2(z_O^{far})}{z_O^{far} f} O_{size} F_\#,$$

wherein $O_{size}$ is the spot size on the optical sensors, f is the focal length of the transfer device $F_\#$ is the F number of the transfer device, $z_O^{far}$ is the farthest object distance.

As outlined above, by evaluating the first and second sensor signals, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. A single transversal sensor may be sufficient to allow determining of the position (X,Y,Z) of the object, such as a single quadrant diode or a single resistive lateral PSD. The combined signal or the longitudinal coordinate z can be determined from using a sum of the signals of these sensors and, in addition, these sensors are configured for determining the transversal coordinates (X,Y). Various transversal sensors are generally known in the art, such as the transversal sensors disclosed in WO 2014/097181 A1 and/or other position-sensitive devices (PSDs), such as quadrant diodes, CCD or CMOS chips, Split electrode PSDs, e.g. tetra-lateral PSDs as available from OSI Optoelectronics, or the like. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object.

The detector may comprise at least two optical sensors, preferably a plurality of optical sensors. As used herein, the term "at least two optical sensors each have at least one light-sensitive area" refers to configurations with two single optical sensors each having one light-sensitive area and to configurations with one combined optical sensor having at least two light-sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the setup. Other embodiments, however, are feasible. Thus, as an example, an optical device comprising two, three, four or more than four light-sensitive areas may be used which is regarded as two, three, four or more than four optical sensors in the context of the present invention. As an example, the optical device may comprise a matrix of light-sensitive areas. Thus, as an example, the optical sensors may be part of or constitute a pixelated optical device. As an example, the optical sensors may be part of or constitute at least one CCD and/or CMOS device having a matrix of pixels, each pixel forming a light-sensitive area. For example, the optical sensors may be partial diodes of a bi-cell, a split electrode PSD (position sensitive device), or quadrant diode. For example, the optical sensors may be or may comprise at least one element selected from the group consisting of a CCD sensor element, a CMOS sensor element, a photodiode, a photocell, a photoconductor, a phototransistor or any combination thereof.

The optical sensors may be partial diodes of a bi-cell, a split electrode PSD, or quadrant diode and/or comprise at least one CMOS sensor. For example, the optical sensors may comprise at least one CMOS sensor. The light beam having passed through the dichroic filter may impinge at different locations or regions on the CMOS sensor dependent on wavelength and the angle of incidence on the dichroic filter. For determining the combined signal Λ, the evaluation device may be adapted to determine a sum, or sum signal, of all signals of the CMOS sensor and to generate the first and the second sensor signal depending on the wavelength. The evaluation device may be configured for determining the combined signal Λ by combining the first and the second sensor signals. The evaluation device may be configured for determining the longitudinal coordinate z of the object by evaluating the combined signal Λ.

In addition, for determining the combined DPR-signal Q, the evaluation device may be adapted to divide a sensor region of the CMOS sensor into at least two sub-regions. Specifically, the evaluation device may be adapted to divide the sensor region of the CMOS sensor into at least one left part and at least one right part and/or at least one upper part and at least one lower part and/or at least one inner and at least one outer part. The evaluation device may be configured for selecting one of the sensor signals of the sub-regions as the first DPR-sensor signal and the sensor signal of the other sub-region as second DPR-sensor signal. The evaluation device may be configured for determining the at least one longitudinal coordinate $z_{DPR}$ of the object by evaluating the combined DPR-signal Q from the sensor signals of the at least two sub-regions.

For example, the optical sensors may be partial diodes of a segmented diode, with a center of the segmented diode being off-centered from the optical axis of the detector. The light beam having passed through the dichroic filter may impinge at segments or quadrants on the diodes dependent on wavelength and the angle of incidence on the dichroic filter. As used herein, the term "partial diode" may comprise several diodes that are connected in series or in parallel. This example is rather simple and cost-efficiently realizable. Thus, as an example, bi-cell diodes or quadrant diodes are widely commercially available at low cost, and driving schemes for these bi-cell diodes or quadrant diodes are generally known. As used herein, the term "bi-cell diode" generally refers to a diode having two partial diodes in one packaging. Bi-cell and quadrant diodes may have two or four separate light-sensitive areas, in particular two or four active areas. As an example, the bi-cell diodes may each form independent diodes having the full functionality of a diode. As an example, each of the bi-cell diodes may have a square or rectangular shape, and the two diodes may be placed in one plane such that the two partial diodes, in total, form a 1×2 or 2×1 matrix having a rectangular shape. In the present invention, however, a new scheme for evaluating the sensor signals of the bi-cell diodes and quadrant diode is proposed, as will be outlined in further detail below. Generally, however, the optical sensors specifically may be partial diodes of a quadrant diode, with a center of the quadrant diode being off-centered from the optical axis of the detector. As used herein, the term "quadrant diode" generally refers to a diode having four partial diodes in one packaging. As an example, the four partial diodes may each form independent diodes having the full functionality of a diode. As an example, the four partial diodes may each have a square or rectangular shape, and the four partial diodes may be placed in one plane such that the four partial diodes, in total, form a 2×2 matrix having a rectangular or square shape. In a further example, the four partial diodes, in total, may form a 2×2 matrix having a circular or elliptical shape. The partial diodes, as an example, may be adjacent, with a minimum separation from one another.

In case a quadrant diode is used, having a 2×2 matrix of partial diodes, the center of the quadrant diode specifically may be off-centered or offset from the optical axis. Thus, as an example, the center of the quadrant diodes, which may be an intersection of the geometrical centers of the optical sensors of the quadrant diode, may be off-centered from the optical axis by at least 0.2 mm, more preferably by at least 0.5 mm, more preferably by at least 1.0 mm or even 2.0 mm. Similarly, when using other types of optical sensors setups having a plurality of optical sensors, an overall center of the optical sensors may be offset from the optical axis by the same distance.

Generally, the light-sensitive areas of the optical sensors may have an arbitrary surface area or size. Preferably, however, specifically in view of a simplified evaluation of the sensor signals, the light-sensitive areas of the optical sensors are substantially equal, such as within a tolerance of less than 10%, preferably less than 5% or even less than 1%. This, specifically, is the case in typical commercially available quadrant diodes.

In typical setups, commercially available quadrant diodes such as quadrant photodiodes are used for positioning, i.e. for adjusting and/or measuring a transversal coordinate of a light spot in the plane of the quadrant photodiode. Thus, as an example, laser beam positioning by using quadrant photodiodes is well known. According to a typical prejudice, however, quadrant photodiodes are used for xy-positioning, only. According to this assumption, quadrant photodiodes are not suitable for measuring distances. For determining the combined signal Λ, the evaluation device may be adapted to determine a sum, or sum signal, of all signals of the quadrant diode and to generate the first and the second sensor signal depending on the wavelength. The evaluation device may be configured for determining the combined signal Λ by combining the first and the second sensor signals. The evaluation device may be configured for determining the longitudinal coordinate z of the object by evaluating the combined signal Λ.

In addition, for determining the combined DPR-signal Q, the asymmetry of the spot can be measured by shifting the quadrant diode slightly off-axis, such as by the above-mentioned offset. Thereby, a monotonously z-dependent function may be generated, such as by forming the combined DPR-signal Q of two or more of the sensor signals of two or more partial photodiodes, i.e. quadrants, of the quadrant photodiode. Therein, in principle, only two photodiodes may be used for the distance measurement. The other two diodes may be used for noise cancellation or to obtain a more precise measurement.

In addition or as an alternative to using a quadrant diode or quadrant photodiode, other types of optical sensors may be used. Thus, for example, staggered optical sensors may be used.

The use of quadrant diodes provides a large number of advantages over known optical detectors. Thus, quadrant diodes are used in a large number of applications in combination with LEDs or active targets and are widely commercially available at very low price, with various optical properties such as spectral sensitivities and in various sizes. No specific manufacturing process has to be established, since commercially available products may be implemented into the detector according to the present invention.

As outlined above, specifically, quadrant photodiodes may be used. As an example, commercially available quadrant photodiodes may be integrated in order to provide four optical sensors, such as one or more quadrant photodiodes available from Hamamatsu Photonics Deutschland GmbH, D-82211 Herrsching am Ammersee, Germany, such as quadrant Si PIN photodiodes of the type S4349, which are sensitive in the UV spectral range to the near IR spectral range. In case an array of optical sensors is used, the array may be a naked chip or may be an encapsulated array, such as encapsulated in a TO-5 metal package. Additionally or alternatively, a surface mounted device may be used, such as TT Electronics OPR5911 available from TT Electronics plc, Fourth Floor, St Andrews House, West Street Woking Surrey, GU21 6EB, England. It shall be noted that other optical sensors may also be used.

Further, it shall be noted that, besides the option of using precisely one quadrant photodiode, two or more quadrant photodiodes may also be used. Thus, as an example, a first quadrant photodiode may be used for the distance measurement, as described above, providing the one or more optical sensors. Another quadrant photodiode may be used, e.g. in a second partial beam path split off from the beam path of the first quadrant photodiode, for a transversal position measurement, such as for using at least one transversal coordinate x and/or y. The second quadrant photodiode, as an example, may be located on-axis with respect to the optical axis.

Further, it shall be noted that, besides the option of using one or more quadrant photodiodes, one or more quadrant photodiodes or further photodiode arrays may also be replaced or mimicked by separated photodiodes that are arranged or assembled close to each other, preferably in a symmetric shape such as a rectangular matrix, such as a 2×2 matrix. However further arrangements are feasible. In such an arrangement or assembly, the photodiodes may be arranged or assembled in a housing or mount, such as all photodiodes in a single housing or mount or groups of photodiodes in one housing or mount, or each of the photodiodes in a separate housing or mount. Further, the photodiodes may also be assembled directly on a circuit board. In such arrangements or assemblies, photodiodes may be arranged as such that the separation between the active area of the photodiodes, has a distinct value less than one centimeter, preferably less than one millimeter, more preferably as small as possible. Further, to avoid optical reflexes, distortions, or the like that may deteriorate the measurement, the space between the active areas may be either empty or filled with a material, preferably with a light absorbing material such as a black polymer, such as black silicon, black polyoxymethylene, or the like, more preferably optically absorbing and electrically insulating material, such as black ceramics or insulating black polymers such as black silicon, or the like. Further, the distinct value of the photodiode separation may also be realized by adding a distinct building block between the photodiodes such as a plastic separator. Further embodiments are feasible. The replacement of quadrant photodiodes by single diodes arranged in a similar setup such as in a 2×2 rectangular matrix with minimal distance between the active areas may further minimize the costs for the optical detector. Further, two or more diodes from a quadrant diode may be connected in parallel or in series to form a single light-sensitive area.

In case a quadrant diode is used, the quadrant diode may also be used for additional purposes. Thus, the quadrant diode may also be used for conventional x-y-measurements of a light spot, as generally known in the art of optoelectronics and laser physics. Thus, as an example, the lens or detector position can be adjusted using the conventional xy-position information of the quadrant diode to optimize the position of the spot for the distance measurement. As a practical example, the light spot, initially, may be located right in the center of the quadrant diode, which typically does not allow for the above-mentioned distance measurement using the combined DPR-signal Q. Thus, firstly, conventional quadrant photodiode techniques may be used for off-centering a position of the light spot on the quadrant photodiode, such that, e.g., the spot position on the quadrant diode is optimal for the measurement. Thus, as an example, the different off-centering of the optical sensors of the detector may simply be a starting point for movement of the optical sensors relative to the optical axis such that the light spot is off-centered with respect to the optical axis and with respect to a geometrical center of the array of the optical sensors. Thus, generally, the optical sensors of the detector may form a sensor array or may be part of a sensor array, such as the above-mentioned quadrant diode. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like. The case m=2, n=2 is the case of the quadrant diode or quadrant optical sensor, which, for practical reasons, is one of the preferred cases, since quadrant photodiodes are widely available. As a starting point, a geometrical center of the optical sensors within the array may be off-centered from the optical axis, such as by the above-mentioned offset. The sensor array specifically may be movable relative to the optical axis, for example along a gradient, preferably automatically, such as by moving the sensor array, e.g. in a plane perpendicular to the optical axis, and/or by moving the optical axis itself, e.g. shifting the optical axis in a parallel shift and/or tilting the optical axis. Thus, the sensor array may be shifted in order to adjust a position of a light spot generated by the light beam in the plane of the sensor array. Additionally or alternatively, the optical axis may be shifted and/or tilted by using appropriate elements, such as by using one or more deflection elements and/or one or more lenses. The movement, as an example, may take place by using one or more appropriate actuators, such as one or more piezo actuators and/or one or more electromagnetic actuators and/or one or more pneumatic or mechanical actuators, which, e.g., move and/or shift the array and/or move and/or shift and/or tillage one or more optical elements in the beam path in order to move the optical axis, such as parallel shifting the optical axis and/or tilting the optical axis. The evaluation device specifically may be adjusted to control a relative position of the sensor array to the optical axis, e.g. in the plane perpendicular to the optical axis. An adjustment procedure may take place in that the evaluation device is configured for, firstly, determining the at least one transversal position of a light spot generated by the light beam on the sensor array by using the sensor signals and for, secondly, moving the array relative to the optical axis, such as by moving the array and/or the optical axis, e.g. by moving the array in the plane to the optical axis until the light spot is off-centered and/or by tilting a lens until the light spot is off-centered. As used therein, a transversal position may be a position in a plane perpendicular to the optical axis, which may also be referred to as the x-y-plane. For the measurement of the transversal coordinate, as an example, the sensor signals of the optical sensors may be compared. As an example, in case the sensor signals are found to be equal and, thus, in case it is determined that the light spot is located symmetrically with respect to the optical sensors, such as in the center of the quadrant diodes, a shifting of the array and/or a tilting of a lens may take place, in order to off-center the light spot in the array. Thus, as outlined above, the off-centering of the array from the optical axis, such as by off-centering the center of the quadrant photodiode from the optical axis, may simply be a starting point in order to avoid the situation which is typical, in which the light spot is located on the optical axis and, thus, is centered. By off-centering the array relative to the optical axis, thus, the light spot should be off-centered. In case this is found not to be true, such that the light spot, incidentally, is located in the center of the array and equally illuminates all optical sensors, the above-mentioned shifting of the array relative to the optical axis may take place, preferably automatically, in order to off-center the light spot on the array. Thereby, a reliable distance measurement may take place.

Further, in a scanning system with a movable light source, the position of the light spot on the quadrant diode may not be fixed. This is still possible, but may necessitate that different calibrations are used, dependent on the xy-position of the spot in the diode.

Further, the use of the above-mentioned combined DPR-signal Q is a very reliable method for distance measurements. Typically, Q is a monotonous function of the longitudinal coordinate of the object and/or of the size of the light spot such as the diameter or equivalent diameter of the light spot. Thus, as an example, specifically in case linear optical sensors are used, the quotient Q is a monotonously decreasing function of the size of the light spot. Without wishing to be bound by this theory, it is believed that this is due to the fact that, in the preferred setup described above, the sensor signals, such as the above-mentioned first sensor signal and the above-mentioned second sensor signal, decrease as a square function with increasing distance to the light source, since the amount of light reaching the detector decreases. Therein, however, due to the off-centering, the one of the sensor signals decreases more rapidly than the other, since, in the optical setup as used in the experiments, the light spot in the image plane grows and, thus, is spread over a larger area. By spreading the light spot, however, the portion of the light illuminating the one or more optical sensors outside the center of the light spot increases, as compared to a situation of a very small light spot. Thus, the quotient of the sensor signals continuously changes, i.e. increases or decreases, with increasing diameter of the light beam or diameter of the light spot. The quotient, further, may further be rendered mainly independent from the total power of the light beam, since the total power of the light beam forms a factor in all sensor signals. Consequently, the quotient Q may form a secondary signal which provides a unique and unambiguous relationship between the sensor signals and the size or diameter of the light beam.

Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the first and second sensor signals and the longitudinal coordinate may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

Each light-sensitive area of the two optical sensors may have a geometrical center, wherein the geometrical centers of the optical sensors are spaced apart from an optical axis of the detector by different spatial offsets. As used herein, the term "geometrical center" of an area generally may refer to a center of gravity of the area. As an example, if an arbitrary point inside or outside the area is chosen, and if an integral is formed over the vectors interconnecting this arbitrary point with each and every point of the area, the integral is a function of the position of the arbitrary point. When the arbitrary point is located in the geometrical center of the area, the integral of the absolute value of the integral is minimized. Thus, in other words, the geometrical center may be a point inside or outside the area with a minimum overall or sum distance from all points of the area. For example, each geometrical center of each light-sensitive area may be arranged at a longitudinal coordinate $I_{center,i}$, wherein i denotes the number of the respective optical sensor. In the case of the detector comprising precisely two optical sensors and in the case of the detector comprising more than two optical sensors, the optical sensors may comprise at least one first optical sensor, wherein the first optical sensor, in particular the geometrical center, being arranged at a first longitudinal coordinate $I_{center,1}$, and at least one second optical sensor, wherein the second optical sensor, in particular the geometrical center, being at a second longitudinal coordinate $I_{center,2}$, wherein the first longitudinal coordinate and the second longitudinal coordinate differ. For example, the first optical sensor and the second optical sensor may be located in different planes which are offset in a direction of the optical axis. The first optical sensor may be arranged in front of the second optical sensor. Thus, as an example, the first optical sensor may simply be placed on the surface of the second optical sensor. Additionally or alternatively, the first optical sensor may be spaced apart from the second optical sensor, for example, by no more than five times the square root of a surface area of a first light-sensitive area, i.e. the light-sensitive area of the first optical sensor. Additionally or alternatively, the first optical sensor may be arranged in front of the second optical sensor and may be spaced apart from the second optical sensor by no more than 50 mm, preferably by no more than 15 mm. Relative distance of the first optical sensor and second optical sensor may depend, for example, on focal length or object distance.

Each geometrical center of each light-sensitive area may be spaced apart from the optical axis of the transfer device, such as the optical axis of the beam path or the respective beam path in which the respective optical sensor is located. The distance, in particular in transversal direction, between the geometrical center and the optical axis is denoted by the term "spatial offset". In the case of the detector comprising precisely two optical sensors and in the case of the detector comprising more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. The first and second spatial offsets, as an example, may differ by at least a factor of 1.2, more preferably by at least a factor of 1.5, more preferably by at least a factor of two.

In the case of the detector comprising precisely two optical sensors and in the case of the detector comprising more than two optical sensors, the optical sensors may comprise at least one first optical sensor having a first surface area and at least one second optical sensor having a second surface area. In the case of the detector comprising more than two optical sensors, e.g. a sensor element comprising a matrix of optical sensors, a first group of optical sensors or at least one of the optical sensors of the matrix may form a first surface area, wherein a second group of optical sensors or at least one other optical sensor of the matrix may form a second surface area. The first surface area and the second surface area may differ. In particular, the first surface area and the second surface area are not congruent. As used herein, the term "surface area" generally refers to both of a shape and a content of at least one light-sensitive area. Thus, the surface area of the first optical sensor and the second optical sensor may differ in one or more of the shape or content. For example, the first surface area may be smaller than the second surface area. As an example, both the first surface area and the second surface area may have the shape of a square or of a rectangle, wherein side lengths of the square or rectangle of the first surface area are smaller than corresponding side lengths of the square or rectangle of the second surface area. Alternatively, as an example, both the first surface area and the second surface area may have the shape of a circle, wherein a diameter of the first surface area is smaller than a diameter of the second surface area. Again, alternatively, as an example, the first surface area may have a first equivalent diameter, and the second surface area may have a second equivalent diameter, wherein the first equivalent diameter is smaller than the second equivalent diameter. The optical sensors, in particular the light-sensitive areas, may overlap or may be arranged such that no overlap between the optical sensors is given.

The first light-sensitive area may be smaller than the second light-sensitive area, i.e. the light-sensitive area of the second optical sensor. As used therein, the term "is smaller than" refers to the fact that the surface area of the first light-sensitive area is smaller than the surface area of the second light-sensitive area, such as by at least a factor of 0.9, e.g. at least a factor of 0.7 or even by at least a factor of 0.5. As an example, both the first light-sensitive area and the second light-sensitive area may have the shape of a square or of a rectangle, wherein side lengths of the square or rectangle of the first light-sensitive area are smaller than corresponding side lengths of the square or rectangle of the second light-sensitive area. Alternatively, as an example, both the first light-sensitive area and the second light-sensitive area may have the shape of a circle, wherein a diameter of the first light-sensitive area is smaller than a diameter of the second light-sensitive area. Again, alternatively, as an example, the first light-sensitive area may have a first equivalent diameter, and the second light-sensitive area may have a second equivalent diameter, wherein the first equivalent diameter is smaller than the second equivalent diameter.

The second light-sensitive area may be larger than the first light-sensitive area. Thus, as an example, the second light-sensitive area may be larger by at least a factor of two, more preferably by at least a factor of three and most preferably by at least a factor of five and the first light-sensitive area.

The first light-sensitive area specifically may be a small light-sensitive area, such that, preferably, the light beam fully illuminates this light-sensitive area. Thus, as an example which may be applicable to typical optical configurations, the first light-sensitive area may have a surface area of 1 $mm^2$ to 150 $mm^2$, more preferably a surface area of 10 $mm^2$ to 100 $mm^2$. The second light-sensitive area specifically may be a large area. Thus, preferably, within a measurement range of the detector, light spots generated by the light beam having passed through the dichroic filter may fully be located within the second light-sensitive area, such that the light spot is fully located within the borders of the second light-sensitive area. As an example, which is applicable e.g. in typical optical setups, the second light-sensitive area may have a surface area of 160 mm² to 1000 mm², more preferably a surface area of 200 mm² to 600 mm².

The optical sensors may be arranged such that the light-sensitive areas of the optical sensors differ in their spatial offset and/or their surface areas. The light-sensitive areas of the optical sensors may overlap, as visible from the object, or may not overlap, i.e. may be placed next to each other without overlap. The light-sensitive areas may be spaced apart from each other or may directly be adjacent. The first light-sensitive area specifically may overlap with the second light-sensitive area in a direction of propagation of the light beam. The light beam having passed through the dichroic filter may illuminate both the first light-sensitive area and, fully or partially, the second light-sensitive area. Thus, as an example, as seen from an object located on an optical axis of the detector, the first light-sensitive area may be located in front of the second light-sensitive area, such that the first light-sensitive area, as seen from the object, is fully located within the second light-sensitive area. When the light beam from this object propagates towards the first and second light-sensitive areas, as outlined above, the light beam having passed through the dichroic filter may fully illuminate the first light-sensitive area and may create a light spot on the second light-sensitive area, wherein a shadow created by the first optical sensor is located within the light spot. It shall be noted, however, that other embodiments are feasible.

The first and second optical sensors specifically may be arranged linearly in one and the same beam path of the detector. As used herein, the term "linearly" generally refers to that the sensors are arranged along one axis. Thus, as an example, the first and second optical sensors both may be located on an optical axis of the detector. Specifically, the first and second optical sensors may be arranged concentrically with respect to an optical axis of the detector.

The first optical sensor may be arranged in front of the second optical sensor. Thus, as an example, the first optical sensor may simply be placed on the surface of the second optical sensor. Additionally or alternatively, the first optical sensor may be spaced apart from the second optical sensor by no more than five times the square root of a surface area of the first light-sensitive area. Additionally or alternatively, the first optical sensor may be arranged in front of the second optical sensor and may be spaced apart from the second optical sensor by no more than 50 mm, preferably by no more than 15 mm. Alternatively to the linear arrangement of the two optical sensors, the optical sensors may be arranged in different beam paths of the detector.

The optical sensors each specifically may be semiconductor sensors, preferably inorganic semiconductor sensors, more preferably photodiodes and most preferably silicon photodiodes. Thus, the present invention simply may be realized by using commercially available inorganic photodiodes, i.e. one small photodiode and one large area photodiode. Thus, the setup of the present invention may be realized in a cheap and inexpensive fashion. Specifically, the first and second optical sensors, each independently, may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, the optical sensors may be sensitive in the part of the near infrared region where silicon photodiodes are applicable specifically in the range of 700 nm to 1000 nm. Infrared optical sensors which may be used for the optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, one of the optical sensors or both the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, one of the optical sensors or both of the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, one of the optical sensors or both of the optical sensors may comprise at least one photoconductive sensor such as a PbS or PbSe sensor, a bolometer, preferably a bolometer selected from the group consisting of a VO bolometer and an amorphous Si bolometer.

The detector may have at least one sensor element having a matrix of optical sensors. The optical sensors each may have a light-sensitive area. Each optical sensor may be configured to generate at least one sensor signal in response to an illumination of the light-sensitive area by the light beam having passed through the dichroic filter.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that the light beam having passed through the dichroic filter may generate a light spot on the common plane.

For determining the combined signal Λ, the evaluation device may be adapted to determine a sum, or sum signal, of all signals of the optical sensors of the matrix and to generate the first and the second sensor signal depending on the wavelength. The term "sum signal" generally refers to a signal being composed of all sensor signals of the optical sensors. Specifically, the sum signal may be determined by adding up all sensor signals of the illuminated optical sensors. The evaluation device may be configured for determining the combined signal Λ by combining the first and the second sensor signal. The evaluation device may be configured for determining the longitudinal coordinate z of the object by evaluating the combined signal Λ.

In addition, for determining the combined DPR-signal Q, the evaluation device may be configured for evaluating the sensor signals, by
a) determining at least one optical sensor having the highest sensor signal and forming at least one center signal;
b) evaluating the sensor signals of the optical sensors of the matrix and forming the at least one sum signal;
c) determining the combined DPR-signal by combining the center signal and the sum signal; and
d) determining the longitudinal coordinate $z_{DPR}$ of the object by evaluating the combined signal.

As explained in more detail in one or more of the above-mentioned prior art documents, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot, may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate $z_{DPR}$ of the object may be generated. The comparing of the center signal and the sum signal, as an example, may be done by forming the combined DPR-signal Q out of the center signal and the sum signal and by using a predetermined or determinable relationship between the longitudinal coordinate $z_{DPR}$ and the combined DPR-signal for deriving the longitudinal coordinate $z_{DPR}$.

Consequently, in accordance with the present invention, the term "center signal" generally refers to the at least one sensor signal comprising essentially center information of the beam profile. As used herein, the term "highest sensor signal" refers to one or both of a local maximum or a maximum in a region of interest. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

Similarly, the term "sum signal" furthermore refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized for example by replacing the area integrals in the combined DPR-signal Q by a line integrals along the slice or cut. For improved accuracy, several slices or cuts through the light spot may be used and averaged. In case of an elliptical spot profile, averaging over several slices or cuts may result in an improved distance information.

The combined DPR-signal Q may be determined by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined DPR-signal may comprise an arbitrary signal or signal combination which contains at least one item of information on a comparison between the center signal and the sum signal.

The light beam having passed through the dichroic filter may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the light beam having passed through the dichroic filter may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

As outlined above, raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or maybe determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, for determining the longitudinal coordinate $z_{DPR}$ the comparison between the center signal and the sum signal specifically may be performed by forming one or more quotient signals. Thus, generally, the combined signal may be a quotient signal, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals.

The evaluation device specifically may be configured for using at least one predetermined relationship between the combined DPR-signal Q and the longitudinal coordinate $z_{DPR}$, in order to determine the at least one longitudinal coordinate $z_{DPR}$. Thus, due to the reasons disclosed above and due to the dependency of the properties of the light spot on the longitudinal coordinate, the combined DPR-signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the quotient Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the combined DPR-signal Q such as the quotient signal. This determining may be a one-step process, such as by directly combining the center signal and the sum signal and deriving the longitudinal coordinate thereof, or may be a multiple step process, such as by firstly deriving the combined DPR-signal from the center signal and the sum signal and, secondly, by deriving the longitudinal coordinate from the combined DPR-signal. Both options, i.e. the option of steps c) and d) being separate and independent steps and the option of steps c) and d) being fully or partially combined, shall be comprised by the present invention.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

As further outlined above, the matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 100 rows, preferably at least 500 rows, more preferably at least 1000 rows. Similarly, the matrix may have at least 100 columns, preferably at least 500 columns, more preferably at least 1000 columns. The matrix may comprise at least 5000 optical sensors, preferably at least 100000 optical sensors, more preferably at least 5000000 optical sensors. The matrix may comprise a number of pixels in a multi-mega pixel range. Other embodiments, however, are feasible. Thus, as outlined above, in setups in which an axial rotational symmetry is to be expected, circular arrangements or concentric arrangements of the optical sensors of the matrix, which may also be referred to as pixels, may be preferred.

As further outlined above, preferably, the sensor element may be oriented essentially perpendicular to the optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup. Additionally or alternatively, the sensor element may be oriented differing from an orientation towards the object. In particular in case the detector comprises two sensor elements, at least one of the sensor elements may be oriented differing from an orientation towards the object. For example, at least one of the sensors elements may be oriented perpendicular or under an arbitrary angle to the optical axis and with respect to the object.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street: *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

The illumination source may be adapted to generate and/or to project a cloud of points such that a plurality of illuminated regions is generated on the matrix of optical sensor, for example the CMOS detector. Additionally, disturbances may be present on the matrix of optical sensor such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or object recognition method.

As outlined above, the illumination source may be configured for illuminating the object with at least one light beam having the at least two different wavelengths. The illumination source may be adapted to generate the first light beam having the first wavelength and the second light beam having the second wavelength. The first light beam and the second light beam may be generated with two different modulation frequencies. For example, the illumination source is configured to pulse the light sources, such as the LEDs, at two different modulation frequencies. The detector may comprise at least two optical sensors such that it is possible to determine in addition to the wavelength dependent combined signal Λ the combined DPR-signal. Specifically, in case two or more optical sensors are used it is possible to determine several different distances dependent quotients from only one measurement. For example, in case exactly two optical sensors are used the following quotients are possible. The combined signal Λ may be determined by dividing a sum of all sensor signals of the optical sensors generated by a light beam having a first wavelength, e.g. for red, by a sum of all sensor signals of the optical sensors generated by a light beam having a second wavelength, e.g. for blue. In addition or alternatively, the combined signal Λ may be determined by dividing the sensor signal of a first optical sensor generated by the light beam having the first wavelength by the sensor signal of the first optical sensor generated by the light beam having the second wavelength. In addition or alternatively, the combined signal Λ may be determined by dividing the sensor signal of a second optical sensor generated by the light beam having the first wavelength by the sensor signal of the second optical sensor generated by the light beam having the second wavelength. In addition or alternatively, the combined DPR-signal may be determined for the light beam having the first wavelength, such as by dividing the sensor signal of the first optical sensor and the second optical sensor generated by the light beam having the first wavelength. In addition or alternatively, the combined DPR-signal may be determined for the light beam having the second wavelength, such as by dividing the sensor signal of the first optical sensor and the second optical sensor generated by the light beam having the second wavelength. Each of these quotients may provide a distance information. The evaluation device may be adapted to verify or check quality of the distance information, for example in view of signal to noise ratio. The evaluation device may be adapted to determine a combined distance information from the different distance information such as by determining a mean value. For example, the detector may be configured for determining the longitudinal coordinate z in a first measurement range and for determining the longitudinal coordinate $z_{DPR}$ in a second measurement range. This may allow enhancing reliability of the distance determination and for extending the measurement range. The combined signal Λ and the combined DPR-signal can be determined independently from each other. The combined signal Λ may be essentially independent of a detector position but may be dependent only on properties of the transfer device and of the dichroic filter. Therefore, the different quotients can be chosen as such that either they can verify each other and increase reliability of the measurement, or that they can cover different measurement ranges and thus, increase the total measurement range of the system. The evaluation device may be configured for comparing the combined signal Λ and the combined DPR signal, specifically in order to recognize mechanical drifts due to temperature changes or mechanical stress and may be used to recalibrate the system or to output a combined longitudinal signal dependent on the combined signal Λ and the combined DPR signal Q.

The distance measurement by using the detector according to the present invention may be enhanced by implementing one or more additional distance measurement means into the detector and/or by combining the detector with other types of distance measurement means.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprises at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 300 to 1000 nm, especially 500 to 1000 nm. Alternatively, as outlined above, the infrared spectral range may be used, such as in the range of 780 nm to 3.0 µm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiments disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source adapted to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the illumination source of the detector. Alternatively, however, the illumination source of the scanning system may also be fully or partially identical with or integrated into the at least one illumination source of the detector.

Thus, the scanning system may comprise at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300-1000 nm, especially 500 to 1000 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined. The illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning device. In particular, the scanning system may, thus, use at least one row scan and/or line scan, such as to scan the one or more surfaces of the one or more objects sequentially or simultaneously. Thus, the scanning system may be adapted to measure angles by measuring three or more dots, or the scanning system may be adapted to measure corners or narrow regions such as a gable of a roof, which may be hardly accessible using a conventional measuring stick. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be adapted to shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with a several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3d model by connecting adjacent points with planar surfaces. The 3d model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning device may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning device is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning device.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The transfer device can also be wholly or partly a constituent part of at least one optional illumination source, for example by the illumination source being designed to provide a light beam having defined optical properties, for example having a defined or precisely known beam profile, for example at least one linear combination of Gaussian beams, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the one or more optional beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers, more preferably in the part of the near infrared region where silicon photodiodes are applicable specifically in the range of 700 nm to 1000 nm. For thermal imaging applications the target may emit light in the far infrared spectral range, preferably in the range of 3.0 micrometers to 20 micrometers. For example, the at least one illumination source is adapted to emit light in the visible spectral range, preferably in the range of 500 nm to 780 nm, most preferably at 650 nm to 750 nm or at 690 nm to 700 nm. For example, the at least one illumination source is adapted to emit light in the infrared spectral range. Other options, however, are feasible.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the transfer device may be designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses a method for determining a position of at least one object, in particular by using a detector such as a detector according to the present invention, such as according to one or more of the embodiments referring to a detector as disclosed above or as disclosed in further detail below. Still, other types of detectors may be used.

The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following steps:
providing at least one dichroic filter having a wavelength dependent and angle dependent transmission spectrum;
providing at least one optical sensor, wherein the optical sensor has at least one light-sensitive area, wherein the optical sensor is designed to generate at least one sensor signal in response to an illumination of its light-sensitive area by the light beam having passed through the dichroic filter;
illuminating the light-sensitive areas of the optical sensor with the light beam having passed through the dichroic filter, wherein, thereby, the light-sensitive area generates at least one sensor signal; and
determining a first sensor signal generated in response to illumination by the light beam having at least one first wavelength and a second sensor signal generated in response to illumination by the light beam having at least one second wavelength;

evaluating the signal components, thereby, determining at least one longitudinal coordinate z of the object, wherein the evaluating comprises deriving a combined signal Λ of the first and second sensor signals.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; an optical data storage application; a security application; a surveillance application; a safety application; a human-machine interface application; a tracking application; a photography application; an imaging application or camera application; a mapping application for generating maps of at least one space; a homing or tracking beacon detector for vehicles; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object. In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application. Additionally or alternatively, applications in local and/or global positioning systems may be named, especially landmark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

The devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

For further applications and uses of the present invention reference may be made to WO 2018/091649 A1, WO 2018/091638 A1 and WO 2018/091640 A1, the content of which is included by reference.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid-state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

As outlined above, the human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically, in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an "entertainment device" is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises the at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a "tracking system" is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The proposed devices and methods provide a large number of advantages over known detectors of this kind. Thus, the detector generally may avoid the shortcomings of the known prior art systems disclosed above. Specifically, the devices and methods allow for using simple and cheap and commercially available semiconductor sensors such as silicon photodiodes.

Overall, in the context of the present invention, the following embodiments are regarded as preferred:

Embodiment 1: A detector for determining a position of at least one object, the detector comprising:
at least one dichroic filter;
at least one optical sensor, wherein the optical sensor has at least one light-sensitive area, wherein the optical sensor is designed to generate at least one sensor signal in response to an illumination of its light-sensitive area by the light beam having passed through the dichroic filter;
at least one evaluation device being configured for determining a first sensor signal generated in response to illumination by the light beam having at least one first wavelength and a second sensor signal generated in response to illumination by the light beam having at least one second wavelength, wherein the evaluation device is configured for determining at least one longitudinal coordinate z of the object by evaluating a combined signal Λ from the first and second sensor signals.

Embodiment 2: The detector according to the preceding embodiment, wherein the dichroic filter has a wavelength dependent and angle dependent transmission spectrum, wherein the dichroic filter has an angle dependency from 5 nm/30° up to 100 nm/30°, preferably from 7 nm/30° up to 80 nm/30°, more preferably from 9 nm/30° up to 50 nm/30°.

Embodiment 3: The detector according to any one of the preceding embodiments, wherein the detector further comprises an illumination source configured for illuminating the object with at least one light beam having at least two different wavelengths.

Embodiment 4: The detector according to any one of the preceding embodiments, wherein the detector comprises at least one transfer device having at least one focal length in response to the at least one incident light beam propagating from the object to the detector.

Embodiment 5: The detector according to any one of the preceding embodiments, wherein the evaluation device is configured for using at least one predetermined relationship between the combined signal Λ and the longitudinal coordinate for determining the longitudinal coordinate.

Embodiment 6: The detector according to any one of the preceding embodiments, wherein the evaluation device is configured for deriving the combined signal Λ by one or more of dividing the first and second sensor signals, dividing multiples of the first and second sensor signals, dividing linear combinations of the first and second sensor signals.

Embodiment 7: The detector according to any one of the preceding embodiments, wherein the evaluation device is configured for determining a first radiant intensity of the first sensor signal and a second radiant intensity of the second sensor signal, wherein the evaluation device is configured for determining a ratio of the first radiant intensity and the second radiant intensity for deriving the combined signal Λ.

Embodiment 8: The detector according to any one of the preceding embodiments, wherein the detector comprises at least two optical sensors, wherein the optical sensors are partial diodes of a bi-cell, a split electrode PSD or quadrant diode.

Embodiment 9: The detector according to any one of the preceding embodiments, wherein the detector comprises at least two optical sensors, wherein the optical sensors comprise at least one CMOS sensor.

Embodiment 10: The detector according to any one of the preceding embodiments, wherein the detector comprises at least two optical sensors, wherein each of the optical sensors has at least one light-sensitive area, wherein each of the optical sensors is designed to generate at least one sensor signal in response to an illumination of its respective light-sensitive area by the light beam having passed through the dichroic filter, wherein at least one of the optical sensors is configured for generating a first DPR-sensor signal and wherein at least one of the optical sensors is configured for generating a second DPR-sensor signal, wherein the evaluation device is configured for determining the longitudinal coordinate $z_{DPR}$ of the object by evaluating a combined DPR-signal Q from the first and second DPR-sensor signals.

Embodiment 11: The detector according to any one of the three preceding embodiments, wherein the evaluation device is configured for deriving the combined DPR-signal Q by $$Q(z_o) = \frac{\int\int_{A_1} E(x, y; z_o) dx dy}{\int\int_{A_2} E(x, y; z_o) dx dy}$$

wherein x and y are transversal coordinates, A1 is a first area of the beam profile of the light beam having passed through the dichroic filter at a sensor position of the optical sensors, A2 is a second area of the beam profile of the light beam having passed through the dichroic filter at the sensor position of the optical sensors, and $E(x,y,z_o)$ denotes the beam profile given at the object distance $z_o$.

Embodiment 12: The detector according to the preceding embodiment, wherein the first DPR-sensor signal comprises information of the first area of the beam profile and the second DPR-sensor signal comprises information of the second area of the beam profile, wherein the first area of the beam profile and the second area of the beam profile are one or both of adjacent or overlapping regions.

Embodiment 13: The detector according to any one of the two preceding embodiments, wherein one of the first area and the second area comprises essentially edge information of the beam profile and the other one of the first area and the second area of the beam profile comprises essentially center information of the beam profile, wherein the evaluation device is configured to derive the combined DPR-signal Q by one or more of dividing the edge information and the center information, dividing multiples of the edge information and the center information, dividing linear combinations of the edge information and the center information.

Embodiment 14: The detector according to any one of the two preceding embodiments, wherein the first wavelength and the second wavelength of the light beam differ, wherein a difference, in particular, the peak to peak difference, between the wavelengths is at least 1 nm, preferably at least 10 nm, more preferably at least 50 nm.

Embodiment 15: A detector system for determining a position of at least one object, the detector system comprising at least one detector according to any one of the preceding embodiments, the detector system further comprising at least one beacon device adapted to direct at least one light beam towards the detector, wherein the beacon device is at least one of attachable to the object, holdable by the object and integratable into the object.

Embodiment 16: A human-machine interface for exchanging at least one item of information between a user and a machine, wherein the human-machine interface comprises at least one detector system according to the preceding embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 17: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 18: A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 19: A scanning system for determining a depth profile of a scenery, the scanning system comprising at least one detector according to any one of the preceding embodiments referring to a detector, the scanning system further comprising at least one illumination source adapted to scan the scenery with at least one light beam.

Embodiment 20: A camera for imaging at least one object, the camera comprising at least one detector according to any one of the preceding embodiments referring to a detector.

Embodiment 21: A readout device for optical storage media, the readout device comprising at least one detector according to any one of the preceding embodiments referring to a detector.

Embodiment 22: A method for determining a position of at least one object, the method comprising the following steps:
providing at least one dichroic filter;
providing at least one optical sensor, wherein the optical sensor has at least one light-sensitive area, wherein the optical sensor is designed to generate at least one sensor signal in response to an illumination of its light-sensitive area by the light beam having passed through the dichroic filter;
illuminating the light-sensitive areas of the optical sensor with the light beam having passed through the dichroic filter, wherein, thereby, the light-sensitive area generates at least one sensor signal; and
determining a first sensor signal generated in response to illumination by the light beam having at least one first wavelength and a second sensor signal generated in response to illumination by the light beam having at least one second wavelength;
evaluating the first sensor signal and the second signal, thereby, determining at least one longitudinal coordinate z of the object, wherein the evaluating comprises deriving a combined signal $\Lambda$ of the first and second signals.

Embodiment 23: A use of the detector according to any one of the preceding embodiments referring to a detector, for a purpose of use, selected from the group consisting of: a position measurement in traffic technology; an entertainment application; an optical data storage application; a security application; a surveillance application; a safety application; a human-machine interface application; a logistics application; an endoscopy application; a medical application; a tracking application; a photography application; a machine vision application; a robotics application; a quality control application; a 3D printing application; an augmented reality application; a manufacturing application; a use in combination with optical data storage and readout.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
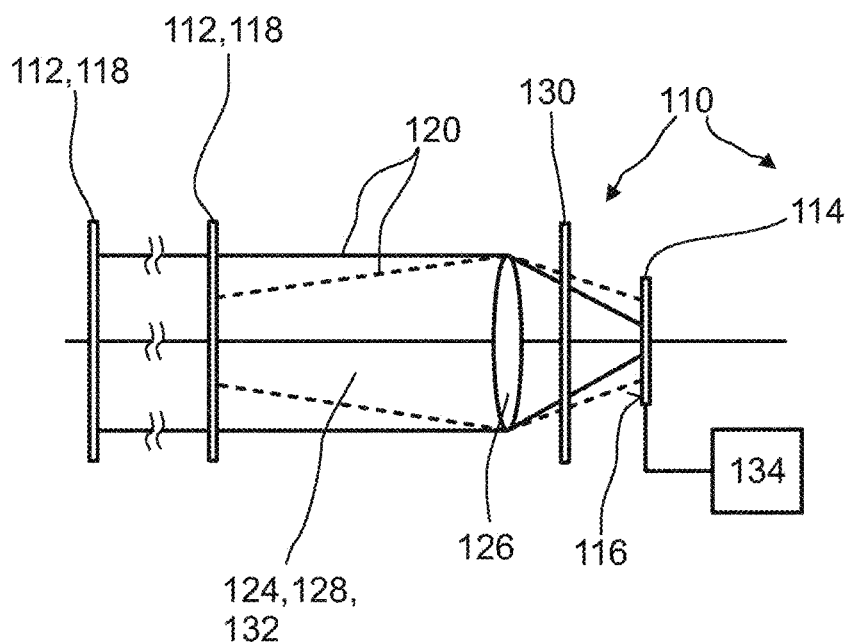
FIG. 1 shows an exemplary embodiment of a detector according to the present invention.

In FIG. 1, a schematic view of an exemplary embodiment of a detector 110 for determining a position of at least one object 112 is depicted. In FIG. 1, the object 112 is depicted for two different object distances. The detector 110 comprises at least one optical sensor 114 having at least one light-sensitive area 116. The object 112 may comprise at least one beacon device 118, from which a light beam 120, also denoted as incident light beam, propagates towards the detector 110. Additionally or alternatively, the detector may comprise at least one illumination source 122 for illuminating the object 112, which is not depicted here. As an example, the illumination source 120 may be configured for generating an illuminating light beam for illuminating the object 112. Specifically, the illumination source 120 may comprise at least one laser and/or laser source. Various types of lasers may be employed, such as semiconductor lasers. Additionally or alternatively, non-laser light sources may be used, such as LEDs and/or light bulbs. The illumination source 120 may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source 120 may have a wavelength of 300 to 1000 nm, especially 500 to 1000 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1000 nm may be used. Further, the illumination source 120 may be configured for emitting modulated or non-modulated light. In case a plurality of illumination sources 120 is used, the different illumination sources may have different modulation frequencies which later on may be used for distinguishing the light beams.

The illumination source 120 may be configured for illuminating the object with at least one light beam having at least two different wavelengths. For example, the illumination source 120 may comprise at least two light sources, wherein a first light source may be configured for generating at least one light beam with a first wavelength and wherein a second light source may be configured for generating at least one light beam with a second wavelength different from the first wavelength. For example, the illumination source 120 may comprise at least one multi-wavelength light source. The illumination source 120 may comprise at least one filter element configured for selectively generating a light beam with different wavelength. The illumination source 120 may be configured to pulse a light beam having the first wavelength and a light beam having the second wavelength with different frequencies The light beam 120, as an example, may propagate along an optical axis 124 of the detector 110. Other embodiments, however, are feasible. The light-sensitive area 116 may be oriented towards the object 112. The optical detector 110 may comprise at least one transfer device 126, such as at least one lens or a lens system, specifically for beam shaping. The transfer device 126 having at least one focal length in response to the incident light beam 120 propagating from the object 112 to the detector 110. The transfer device 126 may have an optical axis 128, wherein the transfer device 126 and the optical sensor 114 preferably may have a common optical axis. The transfer device 126 may constitute a coordinate system. A direction parallel or anti-parallel to the optical axis 124, 128 may be defined as a longitudinal direction, whereas directions perpendicular to the optical axis 124, 128 may be defined as transversal directions, wherein a longitudinal coordinate z is a coordinate along the optical axis 124, 128 and wherein d is a spatial offset from the optical axis 124, 128. Consequently, the light beam 120 is focused, such as in one or more focal points, and a beam width of the light beam 120 may depend on a longitudinal coordinate z of the object 112, such as on a distance between the detector 110 and the beacon device 118 and/or the object 112. The optical sensor 114 may be positioned off focus.

The detector 110 comprises at least one dichroic filter 130. The dichroic filter 130 may be an interference filter having a high angle dependency. The dichroic filter may have an angle dependency from 5 nm/30° up to 100 nm/30°, preferably from 7 nm/30° up to 80 nm/30°, more preferably from 9 nm/30° up to 50 nm/30°. The dichroic filter may have a wavelength dependent and angle dependent transmission spectrum. An electromagnetic wave impinging on a first side, for example a surface of the dichroic filter 130 may be partly, depending on the properties of the dichroic filter, absorbed and/or reflected and/or transmitted. The dichroic filter 130 may be configured to let light, in particular of the light beam 120, having a first wavelength pass through the dichroic filter 130 and to reflect light having a second wavelength such that the light, in particular of the light beam 120, having the second wavelength is filtered. The non-transmitted wavelength may be mostly filtered.

The dichroic filter 130 may have an angle dependent transmission spectrum. The transmission of the dichroic filter 130 may depend on an angle of incidence at which the incident light beam 120 impinges on the dichroic filter 130. For example, the degree of transmission may depend on an angle of incidence at which the incident light beam 120 propagating from the object 112 towards the detector 110 impinges on the dichroic filter 130. The angle of incidence may be measured with respect to an optical axis 132 of the dichroic filter 130. The dichroic filter 130 may be arranged in the direction of propagation behind the at least one transfer device 126. The transfer device 126 may increase the distance dependent angle dependency. The dichroic filter 130 and the transfer device 126 may be arranged such that the light beam 120 propagating from the object 112 to the detector 110 passes through the transfer device 126 before impinging on the dichroic filter 130. The dichroic filter 130 may be arranged as such, that the light beam 120 propagating from the object 112 to the detector 110 impinges on the dichroic filter 130 between the transfer device 126 and the focal point of the transfer device 126. The dichroic filter 130 may be designed to weaken rays impinging with larger angles compared to rays impinging with a smaller angle. For example, the degree of transmission may be highest for light rays parallel to the optical axis 132, i.e. at 0°, and may decrease for higher angles. In particular, at at least one cut-off angle the degree of transmission may steeply fall to zero. Thus, light rays having a large angle of incidence may be cut-off.

For example, the dichroic filter 130 may have a transmission spectrum such that a light beam 120 may pass if the light beam 120 impinges on the dichroic filter 130 under an angle of transmission or a range of transmission and that the light beam 120 is filtered if the light beam 120 impinges under deviating angles of incidence. For example, in case the light beam 120 impinges essentially parallel to the optical axis 132 of the dichroic filter 130 the light beam 120 may pass through the dichroic filter 130 and in case the light beam 230 impinges under deviating angles of incidence the light beam 120 may be filtered.

The transmission spectrum of the dichroic filter 130 is wavelength dependent and angle dependent. For example, the transmission spectrum may be chosen such that a light beam having the first wavelength may pass if the light beam impinges essentially parallel to the optical axis 132 of the dichroic filter 130, while a light beam having the second wavelength may pass the dichroic filter 130 if the light beam impinges under larger angles, e.g. under 30°. The transfer device 126 and the dichroic filter 130 may be arranged such that the light beam 120 propagating from the object 112 to the detector 110 propagates through the transfer device 126 before impinging on the dichroic filter 130. For example, for objects 112 near to a focal point of the transfer device, also referred to as nearfield, light beams behind the transfer device will be mostly parallel to the optical axis and a first transmission spectrum may apply to the light beams at the dichroic filter 130, e.g. the first wavelength may pass whereas the second wavelength may be mostly filtered. For example, for far objects 112, also referred to as far field, light beams will reach the transfer device 126 essentially parallel to the optical axis 128 and will be focused towards the focal point behind the transfer device 126. Thus, these light beams may have a larger angle to the optical axis 132 of the dichroic filter 130 and a different transmission spectrum may apply to the light beams at the dichroic filter, e.g. the second wavelength may pass whereas the first wavelength may be mostly filtered. In FIG. 1, as outlined above, the object 112 is shown at two different distances. Furthermore, the two light beams 120 generated in response to illumination of the object 112 and/or by the beacon devices 118 are shown which reach the transfer device 126 and the dichroic filter 130 depending on the distance under different angles.

Figure 2:
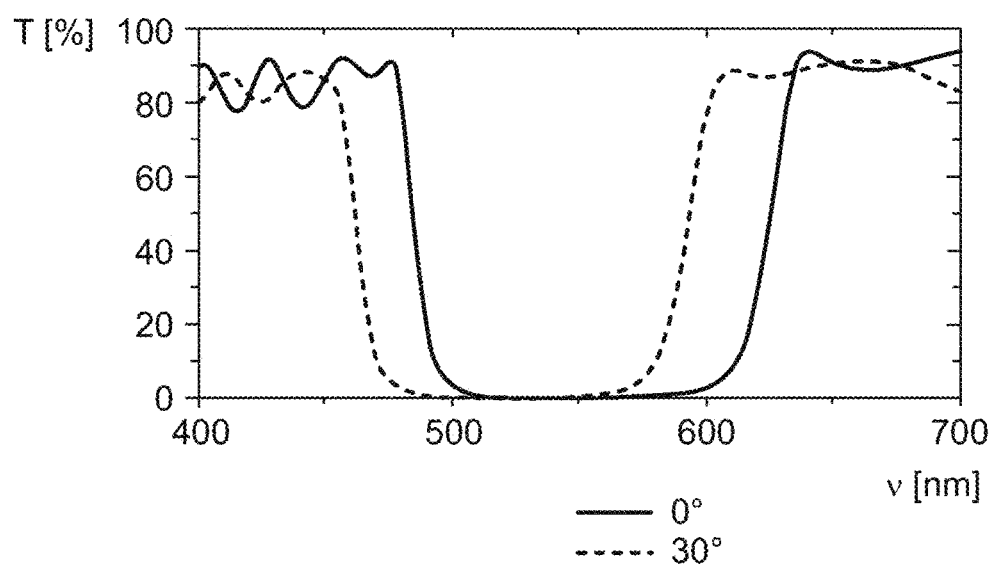
FIG. 2 shows a transmission spectrum of a dichroic filter according to the present invention.

FIG. 2 shows an exemplary transmission spectrum, in particular transmission T in % as a function of the wavelength A in nm of the dichroic filter 130. The transmission spectrum may be chosen such that a first wavelength, e.g. red, passes when light beams are parallel to the optical axis, while a second wavelength, e.g. blue, passes at larger angles such as 30°. For example, for objects 112 near to a focal point of the transfer device 126, also referred to as nearfield, light beams behind the transfer device 126 will be mostly parallel to the optical axis 128 and a first transmission spectrum, in particular a 0°-transmission shown in FIG. 2 as solid line, may apply to the light beams 120 at the dichroic filter 130, e.g. the first wavelength may pass whereas the second wavelength may be mostly filtered. For example, for far objects 112, also referred to as far field, light beams will reach the transfer device 126 essentially parallel to the optical axis 128 of the transfer device 126 and will be focused towards the focal point behind the transfer device 126. Thus, these light beams 120 may have a larger angle to the optical axis 132 of the dichroic filter 130 and a different transmission spectrum, in particular a 30°-transmission shown in FIG. 2 as dashed line, may apply to the light beams 120 at the dichroic filter 130, e.g. the second wavelength may pass whereas the first wavelength may be mostly filtered.

As shown in FIG. 1, the detector 110 comprises at least one evaluation device 134 being configured for determining a first sensor signal generated in response to illumination by the light beam 120 having at least one first wavelength and a second sensor signal generated in response to illumination by the light beam 120 having at least one second wavelength. The evaluation device 134 is configured for determining at least one longitudinal coordinate z of the object 112 by evaluating a combined signal Λ from the first and second sensor signals. The light beams 120 having the first wavelength and the second wavelength may be generated or pulsed with different frequencies and/or may be generated subsequently and/or may be modulated with different modulation frequencies. The combined signal Λ may be generated by combining the first and second sensor signals, in particular by one or more of dividing the first and second sensor signals, dividing multiples of the first and second sensor signals or dividing linear combinations of the first and second sensor signals. In particular, the combined signal Λ may be a quotient signal. The combined signal Λ may be determined by using various means. As an example, a software means for deriving the combined signal, a hardware means for deriving the combined signal, or both, may be used and may be implemented in the evaluation device. Thus, the evaluation device 134, as an example, may comprise at least one divider, wherein the divider is configured for deriving the quotient signal. The divider may fully or partially be embodied as one or both of a software divider or a hardware divider. The evaluation device 134 may be configured for deriving the combined signal Λ by one or more of dividing the first and second sensor signals, dividing multiples of the first and second sensor signals, dividing linear combinations of the first and second sensor signals. The evaluation device 134 may be configured for determining a first radiant intensity of the first sensor signal and a second radiant intensity of the second sensor signal. The evaluation device 134 may be configured for determining a ratio of the first radiant intensity and the second radiant intensity for deriving the combined signal Λ. Other combined or quotient signals are feasible such as ratio of normalized radiant intensity. Thus, the relationship between at least two wavelengths having passed the dichroic filter 132 depends on the distance between the object 112 and the optical sensor 114. Only a single optical sensor 114 is required. The detector 110 may comprise a plurality of optical sensors such as partial diodes of a bi-cell, a split electrode PSD or quadrant diode, and/or a CMOS sensor. In this case, for determining the combined signal Λ, the evaluation device 134 may determine the complete light spot on the optical sensors 114, such as a sum signal of the signals of the optical sensors 114. Alternatively, for determining the combined signal Λ, the evaluation device 134 may use for the first and second sensor signals generated by identical sensor areas.

The determination of the longitudinal coordinate z using the combined signal Λ may be combined with further distance measurement techniques such as with one or more techniques based on depth from photon ratio, time of flight, triangulation and depth from defocus Specifically, the determination of the longitudinal coordinate z using the combined signal Λ may be combined with non-wavelength dependent distance measurement techniques. For example, the determination of the longitudinal coordinate z using the combined signal Λ may be combined with distance measurements using depth from photon ratio (DPR) techniques as described, for example, in WO 2018/091649 A1, WO 2018/091638 A1 and WO 2018/091640 A1, the content of which is included by reference.

Figure 3:
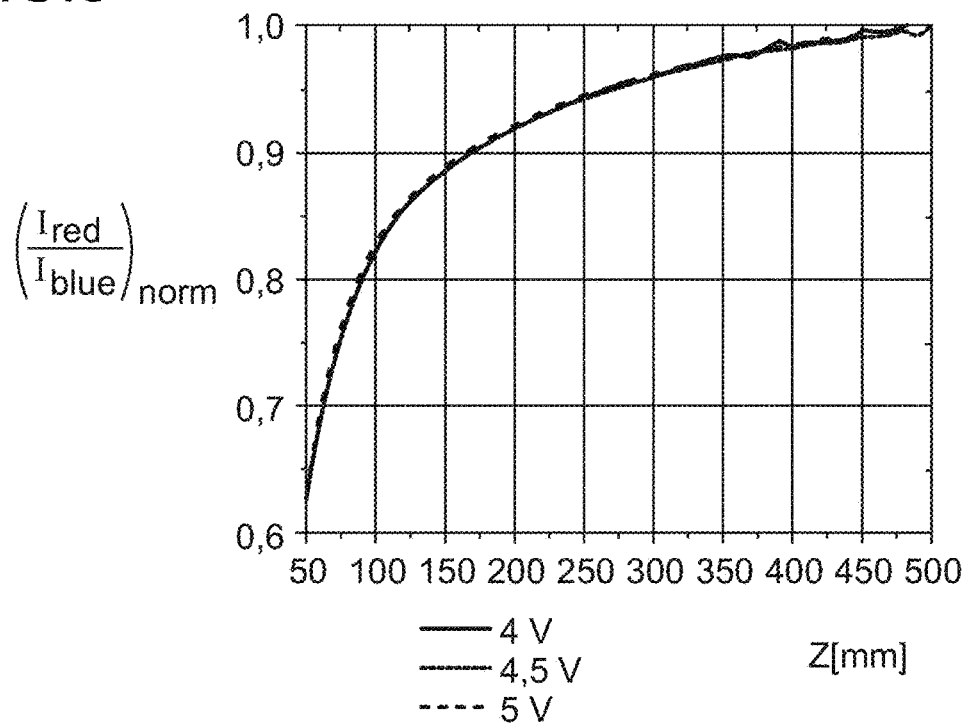
FIG. 3 shows experimental results of a normalized signal ratio for different distances and LED voltages.
Figure 4:
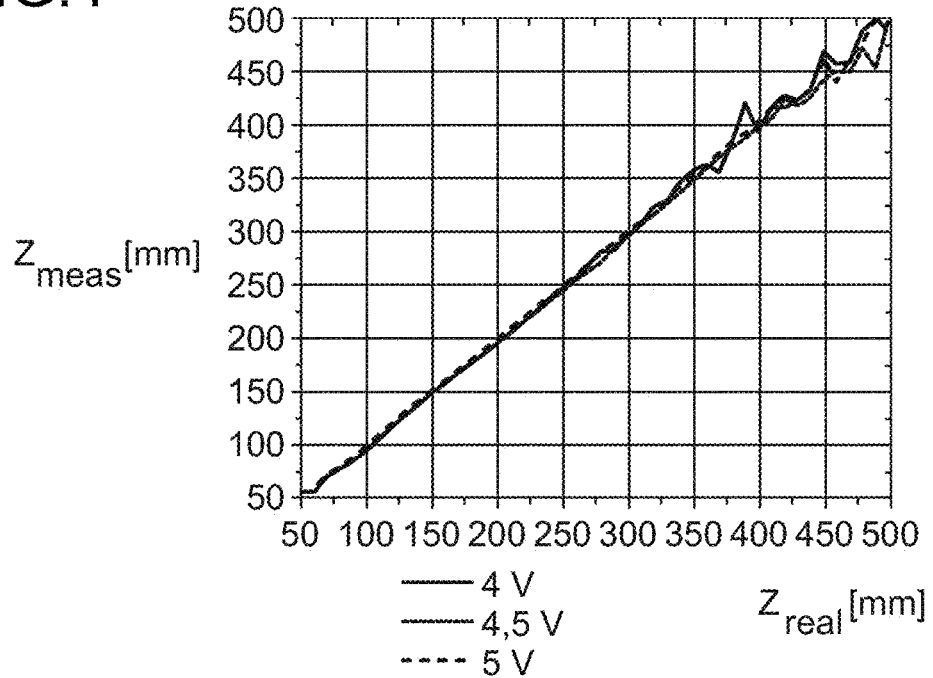
FIG. 4 shows experimental results of the measured distance versus the real distance.

The evaluation device 134 may be configured for determining a first radiant intensity of the first sensor signal and a second radiant intensity of the second sensor signal. The evaluation device 134 may be configured for determining a ratio of the first radiant intensity and the second radiant intensity for deriving the combined signal Λ. The evaluation device 134 may be configured for determining a ratio of the first radiant intensity Ired and the second radiant intensity $I_{blue}$ for deriving the combined signal Λ. FIGS. 3 and 4 show experimental results obtained with a detector setup as shown in FIG. 1. As illumination source 122, a LED available under Vishay Semiconductors VLMRGB343, and as optical sensor 114 a Si-cell available under Thorlabs FDS1010 are employed. The used LED consists of three semiconductor chips capable to radiate at the wavelengths 625 nm, 525 nm and 470 nm simultaneously. In the experiment, only the two chips at 625 nm and 470 nm were driven by an electronic driver circuit. The electronic driver circuit may be adapted to drive both chips at different modulation frequencies such as at 3331 Hz and 5557 Hz, respectively. The two color signal intensities of the Si-cell can be distinguished by using a recording analog front end. As transfer device 126 an aspheric lens available under AL2520 from Thorlabs with a numerical aperture of 0.543 and a focal length of 20 mm, resulting in a maximum angle of incidence of 33° on the dichroic filter 130, FD1M from Thorlabs having the transmission spectrum as shown in FIG. 2. FIG. 3 shows a normalized ratio of the signal intensities from the Si-cell for blue and red radiation $I_{red}/I_{blue}$ as a function of different distances of the object 112 for different operating voltages of the LED, namely for 4V (solid line), 4.5 V (dotted line) and 5V (dashed line). With increasing operating voltage, a driving current and consequently the radiant intensity of the LED increases. By determining the ratio, dependency on the radiant intensity, such as due to a changing power supply, dirt, or decreasing battery power, is eliminated. Thus, the ratio curves for different voltages show very good agreement. By fitting the ratio curves as shown in FIG. 3 with a polynomial function, the measurement system can be calibrated. FIG. 4 shows the measured distance $z_{meas}$ as a function of the real distance $z_{real}$ at the different driving voltages 4V (solid line), 4.5 V (dotted line) and 5V (dashed line). FIG. 4 shows that with the described detector setup reliable distance measurement is possible. For lower voltages, and thus lower radiant intensities, noise can be observed at the end of the measurement range.

Figure 5:
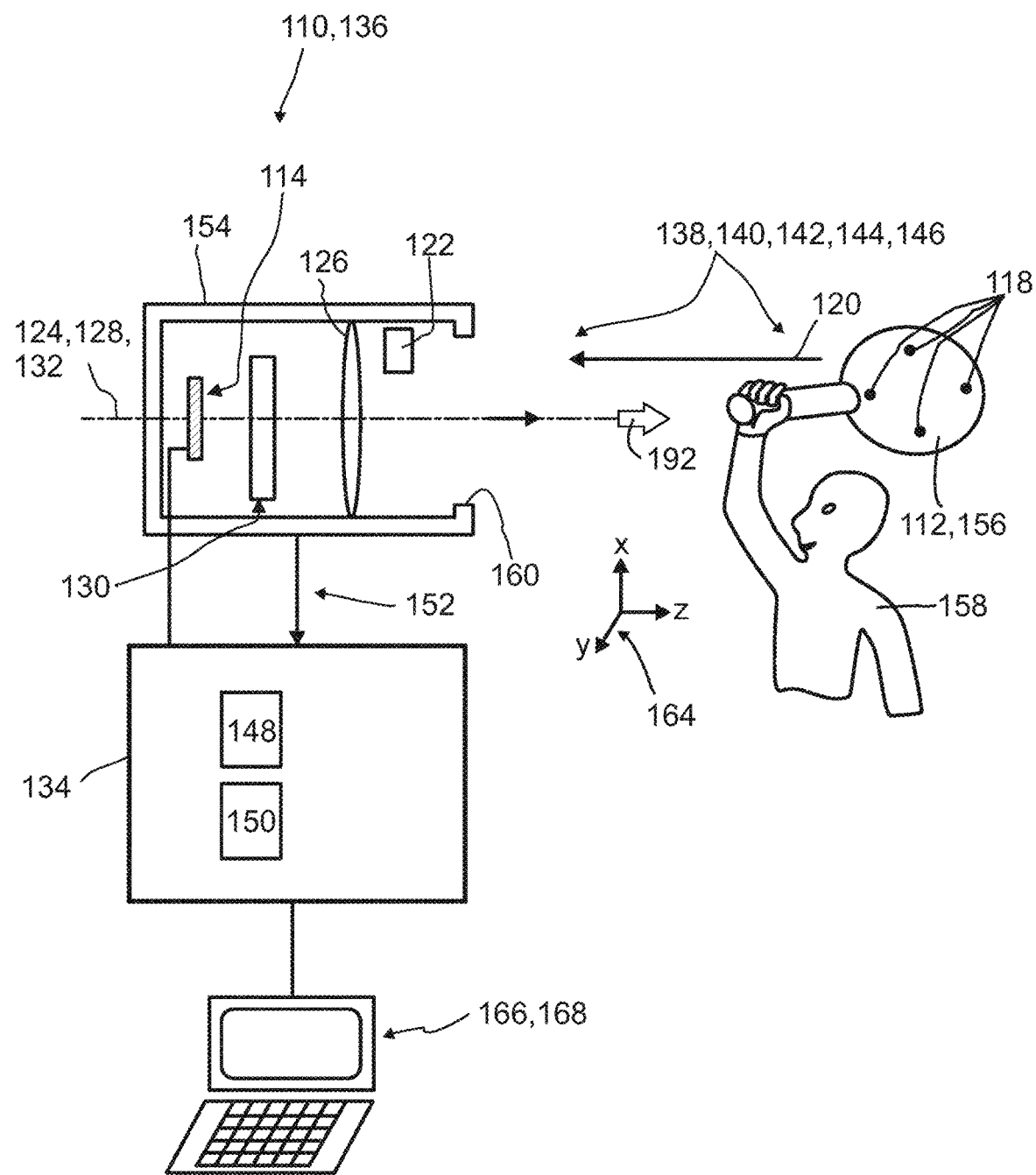
FIG. 5 shows an exemplary embodiment of a detector according to the present invention, a detector system, a human-machine interface, an entertainment device, a tracking system, a scanning system and a camera.

FIG. 5 shows, in a highly schematic illustration, an exemplary embodiment of a detector 110, for example according to the embodiment shown in FIG. 1. The detector 110 specifically may be embodied as a camera 136 and/or may be part of a camera 136. The camera 136 may be made for imaging, specifically for 3D imaging, and may be made for acquiring standstill images and/or image sequences such as digital video clips. Other embodiments are feasible.

FIG. 5 further shows an embodiment of a detector system 138, which, besides the at least one detector 110, comprises one or more beacon devices 118, which, in this example, may be attached and/or integrated into an object 112, the position of which shall be detected by using the detector 110. FIG. 5 further shows an exemplary embodiment of a human-machine interface 140, which comprises the at least one detector system 138 and, further, an entertainment device 142, which comprises the human-machine interface 140. The figure further shows an embodiment of a tracking system 144 for tracking a position of the object 112, which comprises the detector system 138. The components of the devices and systems shall be explained in further detail below.

FIG. 5 further shows an exemplary embodiment of a scanning system 146 for scanning a scenery comprising the object 112, such as for scanning the object 112 and/or for determining at least one position of the at least one object 112. The scanning system 146 comprises the at least one detector 110, and, further, optionally, the at least one illumination source 122 as well as, optionally, at least one further illumination source 122. The illumination source 122, generally, is configured to emit at least one illumination light beam, such as for illumination of at least one dot, e.g. a dot located on one or more of the positions of the beacon devices 118 and/or on a surface of the object 112. The scanning system 146 may be designed to generate a profile of the scenery including the object 112 and/or a profile of the object 112, and/or may be designed to generate at least one item of information about the distance between the at least one dot and the scanning system 146, specifically the detector 110, by using the at least one detector 110.

As outlined above, an exemplary embodiment of the detector 110 which may be used in the setup of FIG. 5 is shown in FIG. 1. Thus, the detector 110, besides the optical sensor 114, comprises the at least one evaluation device 134, having e.g. the at least one divider 148 and/or at least one position evaluation device 150, as symbolically depicted in FIG. 5. The components of the evaluation device 134 may fully or partially be integrated into a distinct device and/or may fully or partially be integrated into other components of the detector 110. Besides the possibility of fully or partially combining two or more components, the optical sensor 114 and one or more of the components of the evaluation device 134 may be interconnected by one or more connectors 152 and/or by one or more interfaces, as symbolically depicted in FIG. 5. Further, the one or more connectors 152 may comprise one or more drivers and/or one or more devices for modifying or preprocessing sensor signals. Further, instead of using the at least one optional connector 152, the evaluation device 134 may fully or partially be integrated into the optical sensor 114 and/or into a housing 154 of the detector 110. Additionally or alternatively, the evaluation device 134 may fully or partially be designed as a separate device.

In this exemplary embodiment, the object 112, the position of which may be detected, may be designed as an article of sports equipment and/or may form a control element or a control device 156, the position of which may be manipulated by a user 158. As an example, the object 112 may be or may comprise a bat, a racket, a club or any other article of sports equipment and/or fake sports equipment. Other types of objects 112 are possible. Further, the user 158 himself or herself may be considered as the object 112, the position of which shall be detected.

The optical sensor 114 may be located inside the housing 154 of the detector 110. Further, the at least one transfer device 126 is comprised, such as one or more optical systems, preferably comprising one or more lenses. An opening 160 inside the housing 154, which, preferably, is located concentrically with regard to the optical axis 124 of the detector 110, preferably defines a direction of view 162 of the detector 110. A coordinate system 164 may be defined, in which a direction parallel or anti-parallel to the optical axis 124 may be defined as a longitudinal direction, whereas directions perpendicular to the optical axis 124 may be defined as transversal directions. In the coordinate system 164, symbolically depicted in FIG. 5, a longitudinal direction is denoted by z, and transversal directions are denoted by x and y, respectively. Other types of coordinate systems 164 are feasible, such as non-Cartesian coordinate systems.

The detector 110 may comprise the optical sensor 114 as well as, optionally, further optical sensors. The optical sensors 114 may be located in one and the same beam path, for example one behind the other. Alternatively, however, a branched beam path may be possible. The branched beam path may comprise additional optical sensors in one or more additional beam paths, such as by branching off a beam path for at least one transversal detector or transversal sensor for determining transversal coordinates of the object 112 and/or of parts thereof. Alternatively, however, the optical sensors 114 may be located at the same longitudinal coordinate.

One or more light beams 120 are propagating from the object 112 and/or from one or more of the beacon devices 118, towards the detector 110. The detector 110 is configured for determining a position of the at least one object 112. For this purpose, as explained above in the context of Fig., the evaluation device 134 is configured to evaluate sensor signals provided by the optical sensors 114. The detector 110 is adapted to determine a position of the object 112, and the optical sensors 114 are adapted to detect the light beam 120. In case no illumination source 122 is used, the beacon devices 118 and/or at least one of these beacon devices 118 may be or may comprise active beacon devices with an integrated illumination source such as a light-emitting diode. In case the illumination source 122 is used, the beacon devices 118 do not necessarily have to be active beacon devices. Contrarily, a reflective surface of the object 112 may be used, such as integrated reflected beacon devices 118 having at least one reflective surface such as a mirror, retro reflector, reflective film, or the like. The light beam 120, directly and/or after being modified by the transfer device 126, such as being focused by one or more lenses, impinges on the dichroic filter 130 and passes and/or is filtered by the dichroic filter 130. The light beam which has passes through the dichroic filter 130 illuminates the light-sensitive areas 121 of the optical sensors 114. For details of the evaluation, reference may be made to FIG. 1 above.

As outlined above, the determination of the position of the object 112 and/or a part thereof by using the detector 110 may be used for providing a human-machine interface 140, in order to provide at least one item of information to a machine 166. In the embodiments schematically depicted in FIG. 5, the machine 166 may be a computer and/or may comprise a computer. Other embodiments are feasible. The evaluation device 134 may even be fully or partially integrated into the machine 166, such as into the computer.

As outlined above, FIG. 5 also depicts an example of a tracking system 144, configured for tracking the position of the at least one object 112 and/or of parts thereof. The tracking system 144 comprises the detector 110 and at least one track controller 168. The track controller 168 may be adapted to track a series of positions of the object 112 at specific points in time. The track controller 168 may be an independent device and/or may be fully or partially integrated into the machine 166, specifically the computer, as indicated in FIG. 5 and/or into the evaluation device 134.

Similarly, as outlined above, the human-machine interface 140 may form part of an entertainment device 142. The machine 166, specifically the computer, may also form part of the entertainment device 142. Thus, by means of the user 158 functioning as the object 112 and/or by means of the user 158 handling a control device 156 functioning as the object 112, the user 158 may input at least one item of information, such as at least one control command, into the computer, thereby varying the entertainment functions, such as controlling the course of a computer game.

LIST OF REFERENCE NUMBERS 110 detector
112 object
114 optical sensor
116 light-sensitive area
118 beacon device
120 light beam
122 illumination source
124 optical axis
126 transfer device
128 optical axis
130 dichroic filter
132 optical axis
134 evaluation device
136 camera
138 detector system
140 human-machine interface
142 entertainment device
144 tracking system
146 scanning system
148 divider
150 position evaluation device
152 connector
154 housing
156 control device
158 user
160 opening
162 direction of view
164 coordinate system
166 machine
168 track controller

The invention claimed is:

1. A detector (110) for determining a position of at least one object (112), the detector (110) comprising:
   at least one dichroic filter (130), wherein the dichroic filter (130) has a wavelength dependent and angle dependent transmission spectrum;
   at least one optical sensor (114), wherein the optical sensor (114) has at least one light-sensitive area (116), wherein the optical sensor (114) is designed to generate at least one sensor signal in response to an illumination of its light-sensitive area (116) by the light beam (120) having passed through the dichroic filter (130);
   at least one transfer device (126), wherein the at least one transfer device is adapted to guide the light beam onto the optical sensor; and
   at least one evaluation device (134) configured for determining a first sensor signal generated in response to illumination by the light beam (120) having at least one first wavelength and a second sensor signal generated in response to illumination by the light beam (120) having at least one second wavelength, wherein the evaluation device (134) is configured for determining at least one longitudinal coordinate z of the object by evaluating a combined signal Λ from the first and second sensor signals.

2. The detector (110) according to claim 1, wherein the dichroic filter (130) has an angle dependency from 5 nm/30° up to 100 nm/30°.

3. The detector (110) according to claim 1, wherein the detector (110) further comprises an illumination source (122) configured for illuminating the object (112) with at least one light beam having at least two different wavelengths.

4. The detector (110) according to claim 1, wherein the at least one transfer device (126) has at least one focal length in response to the at least one incident light beam (120) propagating from the object (112) to the detector (110).

5. The detector (110) according to claim 1, wherein the evaluation device (134) is configured for using at least one predetermined relationship between the combined signal Λ and the longitudinal coordinate for determining the longitudinal coordinate.

6. The detector (110) according to claim 1, wherein the evaluation device (134) is configured for deriving the combined signal Λ by one or more of dividing the first and second sensor signals, dividing multiples of the first and second sensor signals, dividing linear combinations of the first and second sensor signals.

7. The detector (110) according to claim 1, wherein the evaluation device (134) is configured for determining a first radiant intensity of the first sensor signal and a second radiant intensity of the second sensor signal, wherein the evaluation device is configured for determining a ratio of the first radiant intensity and the second radiant intensity for deriving the combined signal Λ.

8. The detector (110) according to claim 1, wherein the detector (110) comprises at least two optical sensors (114), wherein the optical sensors (114) are partial diodes of a bi-cell, a split electrode PSD, or quadrant diode.

9. The detector (110) according to claim 1, wherein the detector (110) comprises at least two optical sensors (114), wherein the optical sensors (114) comprise at least one CMOS sensor.

10. The detector (110) according to claim 1, wherein the detector (110) comprises at least two optical sensors (114), wherein each of the optical sensors (114) has at least one light-sensitive area (116), wherein each of the optical sensors (114) is designed to generate at least one sensor signal in response to an illumination of its respective light-sensitive area (116) by the light beam (120) having passed through the dichroic filter (130), wherein at least one of the optical sensors (114) is configured for generating a first depth-from-photon-ratio (DPR)-sensor signal and wherein at least one of the optical sensors (114) is configured for generating a second DPR-sensor signal, wherein the evaluation device (134) is configured for determining the longitudinal coordinate $z_{DPR}$ of the object by evaluating a combined DPR-signal Q from the first and second DPR-sensor signals.

11. The detector (110) according to claim 10, wherein the evaluation device (134) is configured for deriving the combined DPR-signal Q by $$Q(z_o) = \frac{\int\int_{A_1} E(x, y; z_o) dxdy}{\int\int_{A_2} E(x, y; z_o) dxdy}$$

wherein x and y are transversal coordinates, $A_1$ is a first area of the beam profile of the light beam (120) having passed through the dichroic filter (130) at a sensor position of the optical sensors (114), $A_2$ is a second area of the beam profile of the light beam (120) having passed through the dichroic filter (130) at the sensor position of the optical sensors (114), and E (x,y,$z_o$) denotes the beam profile given at the object distance $z_o$, wherein $A_1$ and $A_2$ correspond to areas of the beam at the first and second wavelengths, respectively.

12. The detector (110) according to claim 11, wherein the first DPR-sensor signal comprises information of the first area of the beam profile and the second DPR-sensor signal comprises information of the second area of the beam profile, wherein the first area of the beam profile and the second area of the beam profile are one or both of adjacent or overlapping regions.

13. The detector (110) according to claim 12, wherein one of the first area and the second area comprises essentially edge information of the beam profile and the other one of the first area and the second area of the beam profile comprises essentially center information of the beam profile, wherein the evaluation device is configured to derive the combined signal Q by one or more of dividing the edge information and the center information, dividing multiples of the edge information and the center information, or dividing linear combinations of the edge information and the center information.

14. A method for determining a position of at least one object (112), the method comprising the following steps:
providing at least one dichroic filter (130);
providing at least one optical sensor (114), wherein the optical sensor (114) has at least one light-sensitive area (116), wherein the optical sensor (114) is designed to generate at least one sensor signal in response to an illumination of its light-sensitive area (116) by the light beam (120) having passed through the dichroic filter (130);
illuminating the light-sensitive areas (116) of the optical sensor (114) with the light beam (120) having passed through the dichroic filter (130), wherein, thereby, the light-sensitive area (116) generates at least one sensor signal;
determining a first sensor signal generated in response to illumination by the light beam (120) having at least one first wavelength and a second sensor signal generated in response to illumination by the light beam (120) having at least one second wavelength; and
evaluating the first sensor signal and the second signal, thereby, determining at least one longitudinal coordinate z of the object, wherein the evaluating comprises deriving a combined signal Λ of the first and second signals.

15. A method of using the detector (110) according to claim 1, the method comprising using the detector (110) for a purpose selected from the group consisting of: a position measurement in traffic technology; an entertainment application; an optical data storage application; a security application; a surveillance application; a safety application; a human-machine interface application; a logistics application; an endoscopy application; a medical application; a tracking application; a photography application; a machine vision application; a robotics application; a quality control application; a 3D printing application; an augmented reality application; a manufacturing application; and in combination with optical data storage and readout.

16. The detector (110) according to claim 1, wherein the dichroic filter (130) has a wavelength dependent and angle dependent transmission spectrum, wherein the dichroic filter (130) has an angle dependency from 7 nm/30° up to 80 nm/30°.

17. The detector (110) according to claim 1, wherein the dichroic filter (130) has a wavelength dependent and angle dependent transmission spectrum, wherein the dichroic filter (130) has an angle dependency from 9 nm/30° up to 50 nm/30°.

* * * * *